United States Patent
Yoshihara et al.

(10) Patent No.: US 11,617,956 B2
(45) Date of Patent: Apr. 4, 2023

(54) NON-TRANSITORY COMPUTER-READABLE STORAGE MEDIUM HAVING GAME PROGRAM STORED THEREIN, GAME SYSTEM, GAME PROCESSING METHOD, AND GAME APPARATUS

(71) Applicant: NINTENDO CO., LTD., Kyoto (JP)

(72) Inventors: Kazuki Yoshihara, Kyoto (JP); Shinji Takei, Kyoto (JP); Soonbae Hwang, Seongnam-si (KR); Sungyong Kim, Seongnam-si (KR); Buhyun Cho, Seongnam-si (KR); Jinung Ju, Seongnam-si (KR)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/241,582

(22) Filed: Apr. 27, 2021

(65) Prior Publication Data
US 2021/0402303 A1   Dec. 30, 2021

(30) Foreign Application Priority Data

Jun. 24, 2020 (JP) .............................. JP2020-108888

(51) Int. Cl.
*A63F 13/00* (2014.01)
*A63F 13/67* (2014.01)
*A63F 13/69* (2014.01)

(52) U.S. Cl.
CPC .............. *A63F 13/67* (2014.09); *A63F 13/69* (2014.09)

(58) Field of Classification Search
CPC .............. A63F 13/798; A63F 2300/558; A63F 2300/807
See application file for complete search history.

(56) References Cited

U.S. PATENT DOCUMENTS

| 2006/0116192 A1* | 6/2006 | Okada ................. G07F 17/3255 463/20 |
| 2013/0116032 A1* | 5/2013 | Lutnick ............... G07F 17/3241 463/25 |
| 2013/0225298 A1* | 8/2013 | Hamlin ................. G06Q 10/10 463/42 |

OTHER PUBLICATIONS

Nintendo Co., Ltd., " Dr. Mario World" [online], [searched on Jun. 10, 2020], Internet—URL: https://apps.apple.com/us/app/dr-mario-world/id1440129313, 3 pages.

\* cited by examiner

*Primary Examiner* — David L Lewis
*Assistant Examiner* — Eric M Thomas
(74) *Attorney, Agent, or Firm* — Nixon & Vanderhye P.C.

(57) ABSTRACT

A first game in which at least a use character that can be used regardless of whether the use character is owned or not owned by a user is used is executed. In addition, a second game in which an owned character that is owned by the user is used is executed. In the first game, when a game is advanced on the basis of a user operation and a progress status of the game satisfies a first condition associated with a skill of the use character, the skill is exercised. Meanwhile, in the second game, when a game is advanced on the basis of a user operation and a progress status of the game satisfies a condition that is associated with a skill of the owned character and different from the first condition associated with the skill in the first game, the skill is exercised.

19 Claims, 17 Drawing Sheets

| CHARACTER ID | SKILL CONTENT INFORMATION | IMAGE DATA |
|---|---|---|
| 0001 | ..... | .... |
| 0002 | ..... | .... |
| 0003 | ..... | .... |
| 0004 | ..... | .... |
| ⋮ | ⋮ | ⋮ |

NON-TRANSITORY COMPUTER-READABLE STORAGE MEDIUM HAVING GAME PROGRAM STORED THEREIN, GAME SYSTEM, GAME PROCESSING METHOD, AND GAME APPARATUS

CROSS REFERENCE TO RELATED APPLICATION

This application claims priority to Japanese Patent Application No. 2020-108888 filed on Jun. 24, 2020, the entire contents of which are incorporated herein by reference.

FIELD

The exemplary embodiments relate to game processing using a skill for exercising a predetermined in-game effect.

BACKGROUND AND SUMMARY

Conventionally, a game in which a skill capable of exercising a predetermined effect in the game is used has been known.

The game as described above may include several game modes. For example, the game may include a story mode in which the game proceeds according to a predetermined scenario, a battle mode in which a battle is made against an AI character or another player, a challenge mode including a high-difficulty stage, etc. As described above, it is not uncommon for a plurality of game modes to be prepared in the same game title, but the usage of the above skill, more specifically, the condition for making it possible to use the skill, is common to each game mode. For example, in the case of a puzzle game of the type in which predetermined objects are deleted and a condition for making it possible to use a skill is to delete a predetermined number of the objects, the condition for making it possible to use the skill is the same for all game modes included in the game. In this regard, there is room for improving the diversity of game development.

Therefore, it is an object of the exemplary embodiments to provide a non-transitory computer-readable storage medium having a game program stored therein, etc., which can improve the diversity of game development regarding use of the same skill.

In order to attain the object described above, for example, the following configuration examples are exemplified.

A configuration example is directed to a non-transitory computer-readable storage medium having stored therein instructions that, when executed by a processor of an information processing apparatus, cause the information processing apparatus to: execute a first game in which at least a use character that can be used regardless of whether a user owns the use character is used, in an application; execute a second game in which an owned character that is a character owned by the user is used, in the application; in the first game, when a game is advanced on the basis of an operation of the user and a first parameter that changes in accordance with a progress status of the game satisfies a first condition associated with a skill of the use character, exercise an in-game effect associated with the skill; and in the second game, when a game is advanced on the basis of an operation of the user and a second parameter that changes in accordance with a progress status of the game satisfies a second condition that is associated with a skill of the owned character and different from the first condition associated with the skill in the first game, exercise an in-game effect associated with the skill. A concept of the progress status of the game includes changes in the degree of accumulation of a gauge and changes due to counting-up or counting-down of time, number of turns, etc.

According to the above configuration example, the skill which is activated by achieving the first condition in the first game can be activated by achieving the second condition different from the first condition, in the second game. That is, the condition for activating the same skill is made different between the first game and the second game provided in the same game title. Accordingly, the user experience regarding the use of the same skill can be made different, so that the diversity of game development can be improved.

In another configuration example, the first condition may be a condition regarding whether a predetermined user operation is performed in the first game, and the second condition may be a condition regarding whether the progress status of the game satisfies a predetermined condition as a result of the predetermined user operation being performed in the first game.

According to the above configuration example, whereas the first condition can be achieved by simply performing a predetermined operation, a predetermined result needs to be involved as a result of an operation, for the second condition. Therefore, it is possible to make a difference in the ease of achieving the condition. Accordingly, regarding the use of skill, the user experience in the first game and the user experience in the second game can be made different, so that the diversity of the game can be increased.

In another configuration example, the first condition may be a condition regarding the number of times the predetermined user operation performed in the first game is accepted, and the second condition may be a condition regarding a parameter that changes when the progress status of the game satisfies a predetermined condition as a result of accepting the predetermined user operation.

In still another configuration example, the second condition may be a condition that is more difficult to achieve than the first condition.

According to the above configuration example, the frequency of skill activation based on the achievement of the first condition can be increased.

In still another configuration example, game rules of the first game and the second game may be at least partly common, and a process, in which a progress status of the game based on a predetermined user operation when the predetermined user operation is performed in the first game is the same as that when the predetermined user operation is performed in the second game, may be executed.

In still another configuration example, when the first condition is satisfied, progress of the game may be restricted until the in-game effect associated with the skill is exercised.

In still another configuration example, when a user operation is performed in a state where the first condition is satisfied, the in-game effect associated with the skill may be exercised, and the restriction of the progress of the game may be cancelled in accordance with the in-game effect being exercised.

According to the above configuration example, the user can be caused to periodically use the skill corresponding to the first condition. Accordingly, the frequency of occurrence of the skill corresponding to the first condition can be increased, so that a user experience different from normal play can be provided.

In still another configuration example, the first game in which at least one use character and at least one owned character are used may be executed; when a progress status of the first game satisfies the first condition associated with the skill of the use character, the in-game effect associated with the skill of the use character may be exercised; and when the progress status of the first game satisfies the second condition associated with the skill of the owned character, the in-game effect associated with the skill of the owned character may be exercised.

According to the above configuration example, in the first game, even a character that is not owned by the user can be used as the use character, and the skill of the character can be used. Accordingly, the user can be allowed to enjoy the game in which the skills of both a character that is owned by the user and a character that is not owned by the user are used, so that the game development can be diverse.

In still another configuration example, the instructions may further cause the computer to, when a predetermined giving condition is satisfied, give a character associated with the same skill as that of the use character, among a plurality of characters with each of which a skill is associated, as an owned character that is a character owned by the user, to the user.

In still another configuration example, the first game and the second game may be puzzle games for a purpose of deleting puzzle objects, the first condition may be a condition regarding a predetermined user operation being performed on the puzzle object, and the second condition may be a condition regarding a parameter that changes when the puzzle object is deleted.

According to the above configuration example, the entertainment characteristics of the puzzle game can be further enhanced.

Another configuration example is directed to a non-transitory computer-readable storage medium having stored therein instructions that, when executed by a processor of an information processing apparatus, cause the information processing apparatus to: execute a game in which a skill capable of exercising a predetermined in-game effect is used and which has a first game mode and a second game mode; in the first game mode, when a status of a game satisfies a first useable condition as a result of advancing the game on the basis of an operation of a user, exercise the in-game effect associated with the skill; and in the second game mode, when a status of a game satisfies a second useable condition different from the first useable condition associated with the skill in the first game mode as a result of advancing the game on the basis of an operation of the user, exercise the in-game effect associated with the skill.

According to the above configuration example, the skill which is activated by achieving the first useable condition in the first game mode can be activated by achieving the second useable condition different from the first useable condition, in the second game mode. Accordingly, the user experience regarding the use of the same skill can be made different, so that the diversity of game development can be improved.

In still another configuration example, the first useable condition may be a condition based on the number of times a predetermined user operation is performed, and the second useable condition may be a condition based on the number of times a specific game processing result is obtained, among a plurality of game processing results obtained as a result of predetermined game processing being performed when the predetermined user operation is performed. Furthermore, the predetermined user operation may be an operation for moving a predetermined object, and the instructions may further cause the computer to: in the first game mode, when the first useable condition is satisfied, restrict acceptance of the user operation for moving the predetermined object; and cancel the restriction after the in-game effect associated with the skill is exercised in accordance with an operation of the user for using the skill.

According to the above configuration example, the user can be caused to use a predetermined skill periodically to some extent in the first game mode. Accordingly, the user can be allowed to practice what the skill is like and deepen the understanding of the skill. In addition, it is also possible to provide a different user experience regarding game development than in the second game mode.

According to the exemplary embodiments, in the same game, the condition for activating the same skill is made different between the first game and the second game provided in the game. Accordingly, the diversity of game development can be improved.

BRIEF DESCRIPTION OF THE DRAWINGS

FIG. 9 illustrates a non-limiting example of the data structure of character master data 302;

DETAILED DESCRIPTION OF NON-LIMITING EXAMPLE EMBODIMENTS

Hereinafter, one exemplary embodiment will be described. It is to be understood that, as used herein, elements and the like written in singular form with a word "a" or "an" attached before them do not exclude those in the plural form.

[Hardware Configuration of Information Processing Apparatus]

First, the configuration of an information processing apparatus according to the exemplary embodiment will be described. In the exemplary embodiment, for example, a smart device such as a smartphone and a tablet, a game apparatus such as a stationary game apparatus and a handheld game apparatus, a personal computer, or the like is assumed as an information processing apparatus 102. In the following description, an information processing apparatus (for example, a smartphone) including a display screen and a touch panel that are integrated with each other will be described as an example. Therefore, input operations are mainly inputs to the touch panel. However, in another exemplary embodiment, for input operation, a physical controller connected to an information processing apparatus 102 wirelessly or via wire may be employed, or for example, an input apparatus formed integrally with the information processing apparatus 102 may be employed.

Figure 1:
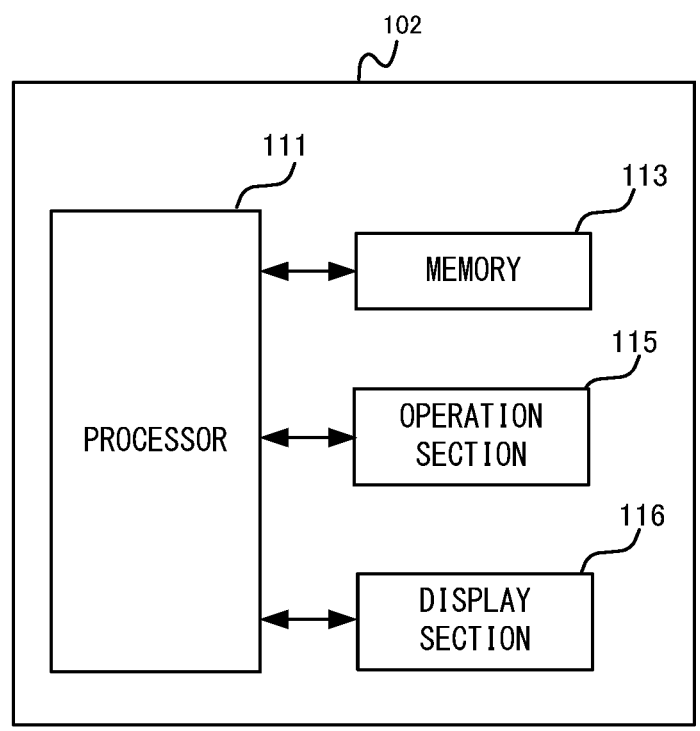
FIG. 1 is a block diagram showing a non-limiting example of the configuration of an information processing apparatus 102.

FIG. 1 is a functional block diagram of the information processing apparatus 102 according to the exemplary embodiment. In FIG. 1, the information processing apparatus 102 includes a processor 111, a memory 113, an operation section 115, and a display section 116. The processor 111 controls operation of the information processing apparatus 102 by executing information processing described later, or by executing a system program (not shown) for controlling overall operation of the information processing apparatus 102. The processor 111 may include a single processor or a plurality of processors. Various kinds of programs to be executed by the processor 111 and various kinds of data to be used in the programs are stored in the memory 113. The memory 113 is, for example, a flash EEPROM or a hard disk device. The operation section 115 is, for example, an input device for accepting an operation from a user. The display section 116 is typically a liquid crystal display device. In the processing according to the exemplary embodiment, a touch panel integrated with a liquid crystal screen is assumed as the operation section 115 and the display section 116. In another exemplary embodiment, a predetermined pointing device other than a touch panel may be used as the operation section 115.

[Outline of Game Processing According to Exemplary Embodiment]

Figure 2:
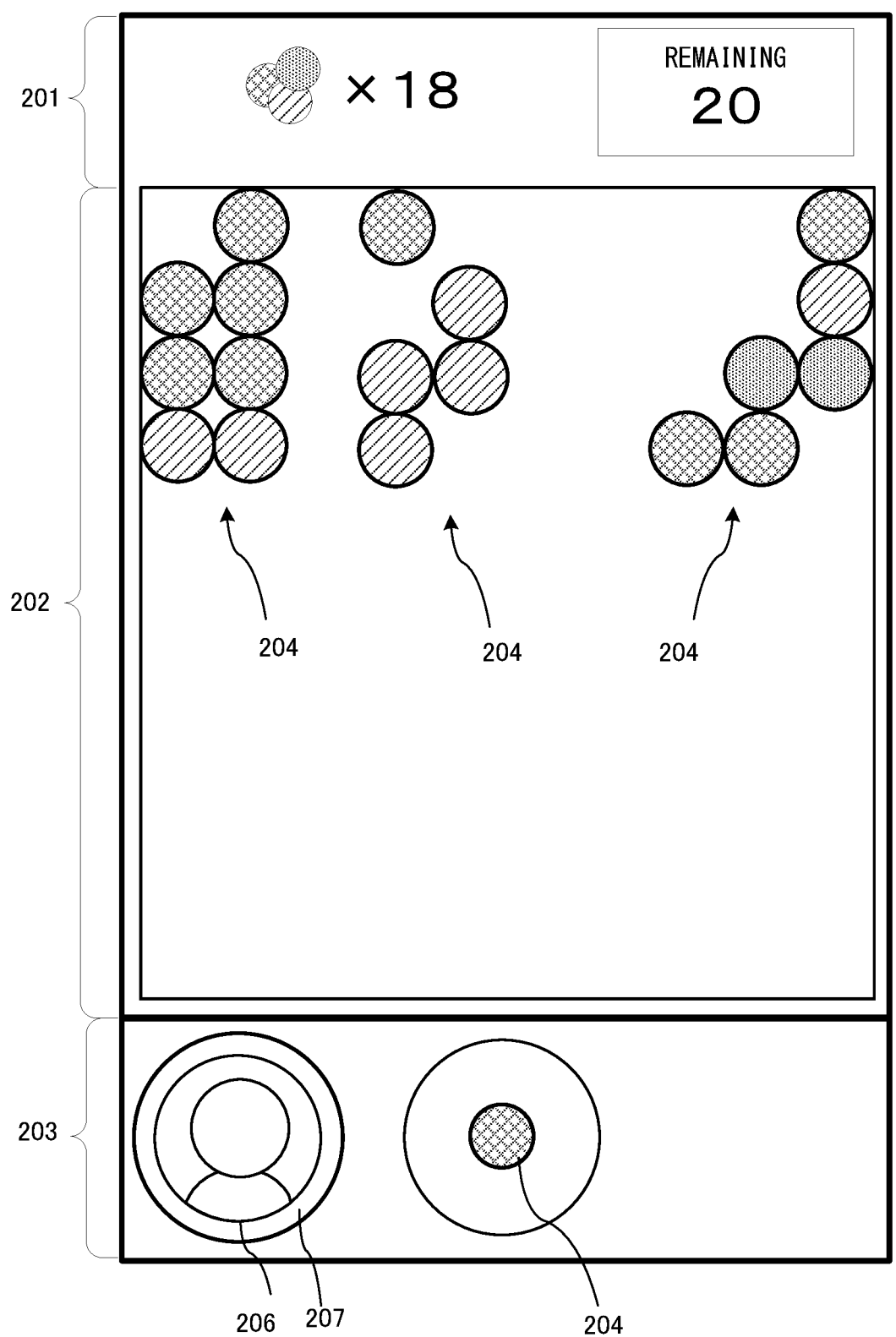
FIG. 2 illustrates a non-limiting screen example of a second game mode.

Next, the outline of information processing executed in the exemplary embodiment will be described. In the exemplary embodiment, game processing for executing a game application will be described as an example of the information processing. First, the outline of the game application realized by the game processing (hereinafter, referred to merely as game) will be described. The game assumed in the exemplary embodiment is a puzzle game similar to a so-called match 3 game. FIG. 2 shows an example of a game image of the game assumed in the exemplary embodiment. The game image shown in FIG. 2 roughly includes three areas. Specifically, the game image includes three areas: an information area 201, a field area 202, and an operation area 203. In the field area 202, a plurality of circular puzzle objects 204 are displayed. In this example, a description will be given with an example in which there are three types of puzzle objects 204 as these puzzle objects 204 (FIG. 2 shows the difference in type by the pattern of each puzzle object 204). This game is a game for the purpose of deleting all puzzle objects 204 in this field area. As a basic game rule, by aligning three or more puzzle objects 204 of the same type vertically or horizontally, these puzzle objects 204 can be deleted. In addition, it is also possible to delete puzzle objects 204 by using a "skill" described later.

The basic operations in this game will be described. First, in the operation area 203, an image of a player character 206 is displayed near the left end thereof, and an annular skill gauge 207 is displayed so as to surround the image of the player character 206. Furthermore, a puzzle object 204 is displayed at substantially the center of the operation area 203. The puzzle object 204 displayed in the operation area 203 is a direct operation target for the user. In the following description, this puzzle object 204 is specifically referred to as an operation target object. The user can place the operation target object at a certain position in the field area 202 by dragging and dropping the operation target object. The placed operation target object automatically moves directly upward from that position. As a result, if the operation target object comes into contact with another puzzle object 204, the movement of the operation target object stops. At this time, a matching determination process for determining whether three or more puzzle objects 204 of the same type are aligned vertically or horizontally as described above is performed. As a result, if these puzzle objects 204 are aligned, the puzzle objects 204 are deleted. After the operation target object is placed in the field area 202, the next operation target object will appear in the operation area 203. As described above, the user plays with the aim of placing the operation target objects one after another in the field area 202 and deleting all the puzzle objects 204 that are originally disposed in the field area 202.

Here, the information area 201 will be described. The number of puzzle objects 204 remaining in the field area 202 is shown on the right side in the information area 201. In addition, the remaining number of operation target objects that have not yet appeared is shown on the left side in the information area 201. Thus, this game is a game in which all puzzle objects 204 in the field area 202 are deleted using a limited number of operation target objects.

Next, the "skill" and the "character" in this game will be described. As described above, in this game, it is also possible to delete puzzle objects 204 by using a skill of which use is made possible by satisfying a predetermined usable condition. This skill is associated with each character. Specifically, in this game, a plurality of types of characters are prepared, and the effect of the skill is different for each character. That is, a plurality of characters have different skills. For example, a "skill A" of a "character A" has an effect of deleting the lowest horizontal row of the puzzle objects 204 remaining in the field area 202. In addition, for example, a "skill B" of a "character B" has an effect of deleting puzzle objects 204 arranged in an L shape. Moreover, for example, a "skill C" of a "character C" has an effect of randomly deleting a vertical row. In the exemplary embodiment, the name "skill" is used, but in another game, for example, "technique", "magic", "special ability", etc., may be used as the name.

Figure 3:
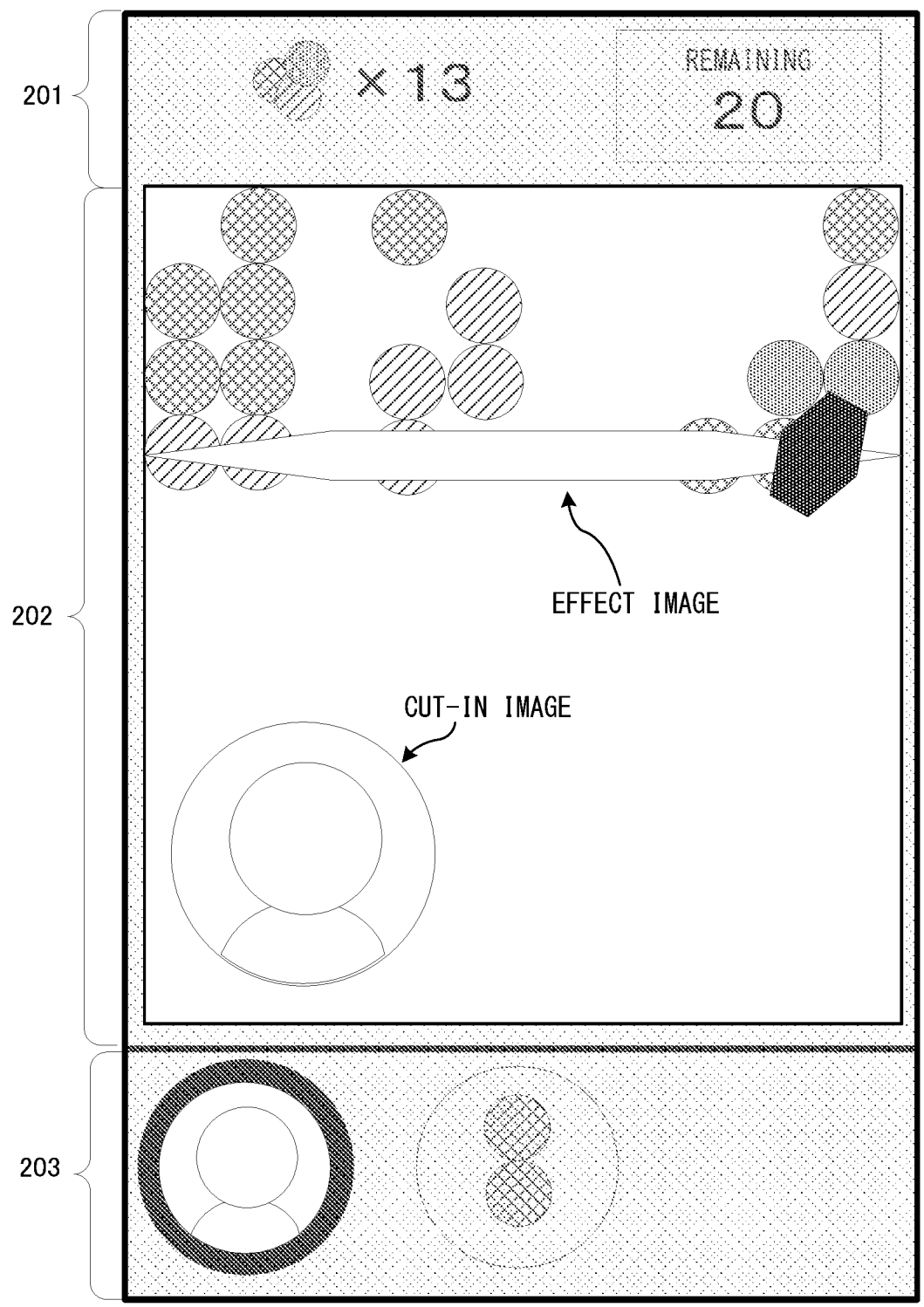
FIG. 3 illustrates a non-limiting screen example of the second game mode.

In this game, it is necessary to satisfy a predetermined condition in order to use the above skill. Specifically, every time puzzle objects 204 are deleted, the skill gauge 207 is increased by a predetermined amount. Regarding the display of the gauge amount of the skill gauge 207 shown in FIG. 2, the degree of accumulation of the gauge is shown such that the gauge extends clockwise from the position corresponding to 0 o'clock. As the user deletes puzzle objects 204, the skill gauge 207 is accumulated (basically, the skill gauge 207 is increased in proportion to the number of the puzzle objects 204 deleted). The rate of increase of the skill gauge 207 is not always constant, and, for example, if a combo occurs as a result of deleting puzzle objects 204, the amount of increase at one time may be made larger. Moreover, when the number of puzzle objects 204 deleted at one time is larger, the amount of increase may be made larger. The skill gauge 207 is accumulated as described, and when the skill gauge 207 has been accumulated to the maximum value, it becomes possible to use the above skill. At this time, the user is visually informed that it becomes possible to use the skill, for example, by blinking the skill gauge 207. In this state, when the user performs a tap operation on the player character 206 at any timing, the user can use the skill associated with the player character 206. FIG. 3 shows an example of a game image when an operation for using the skill is performed. When the skill is used, a "skill representation" that predetermined puzzle objects 204 are deleted in accordance with the content of the skill, is displayed. In this example, it is assumed that the skill A of the character A is used. The skill A is to "delete the lowest horizontal row" as described above. Therefore, in the skill representation shown in FIG. 3, a cut-in image of the player character 206, and an effect image that the puzzle objects 204 in the lowest horizontal row are deleted, are displayed. During the skill representation, any operation on the operation target object, etc., is not accepted. When this skill representation is completed, the state of the field area 202 changes to a state where the puzzle objects 204 in the lowest horizontal row are deleted. In addition, along with this, the skill gauge 207 also returns to the initial value (empty state).

As described above, in this game, a plurality of characters and a plurality of skills are prepared, but the user cannot use all of these characters from the beginning. In this game, only one predetermined character is given to the user when the game is started for the first time (for example, in a tutorial). After that, the user can acquire other characters by achieving a predetermined giving condition. For example, it is possible to execute a character selection process by the user consuming a predetermined item acquired in the game, and a certain character is given to the user as a result of the selection. In addition, a predetermined character may be given as a reward for clearing a predetermined quest. In the following description, a character that has already been acquired by the user is referred to as an "owned character", and a character that has not been acquired yet is referred to as a "non-owned character". In addition, in the following, a description will be given with the case where the user owns two characters, the "character A" and the "character B", as an example. When playing this game, any one of these characters is selected and used. The example of FIG. 2 is an example in which the character A is displayed as the player character 206.

Meanwhile, in this game, there are two game modes. One of these modes is a game mode in which the screen as described above is displayed and the game proceeds by the operations as described above. The other mode is a game mode in which, in addition to the player character 206, another character further appears. More specifically, in this game mode, the player character plays the role of "student", and the other character appears in the role of "instructor". Then, the instructor presents the student with a predetermined clearing condition in the form of "mission". The clearing condition is, for example, "delete n puzzle objects of a certain type", or the like. While the user advances the game with the aim of clearing the mission, a skill of the instructor can be used in such a manner that the instructor "helps". In the following description, the game mode in which a plurality of characters appear as described above is referred to as a "first game mode", and the above other game mode is referred to as a "second game mode". The first game mode is, for example, an event-like game mode that can be played for a limited time, and the second game mode is a permanent game mode, which is the basis of this game.

Figure 4:
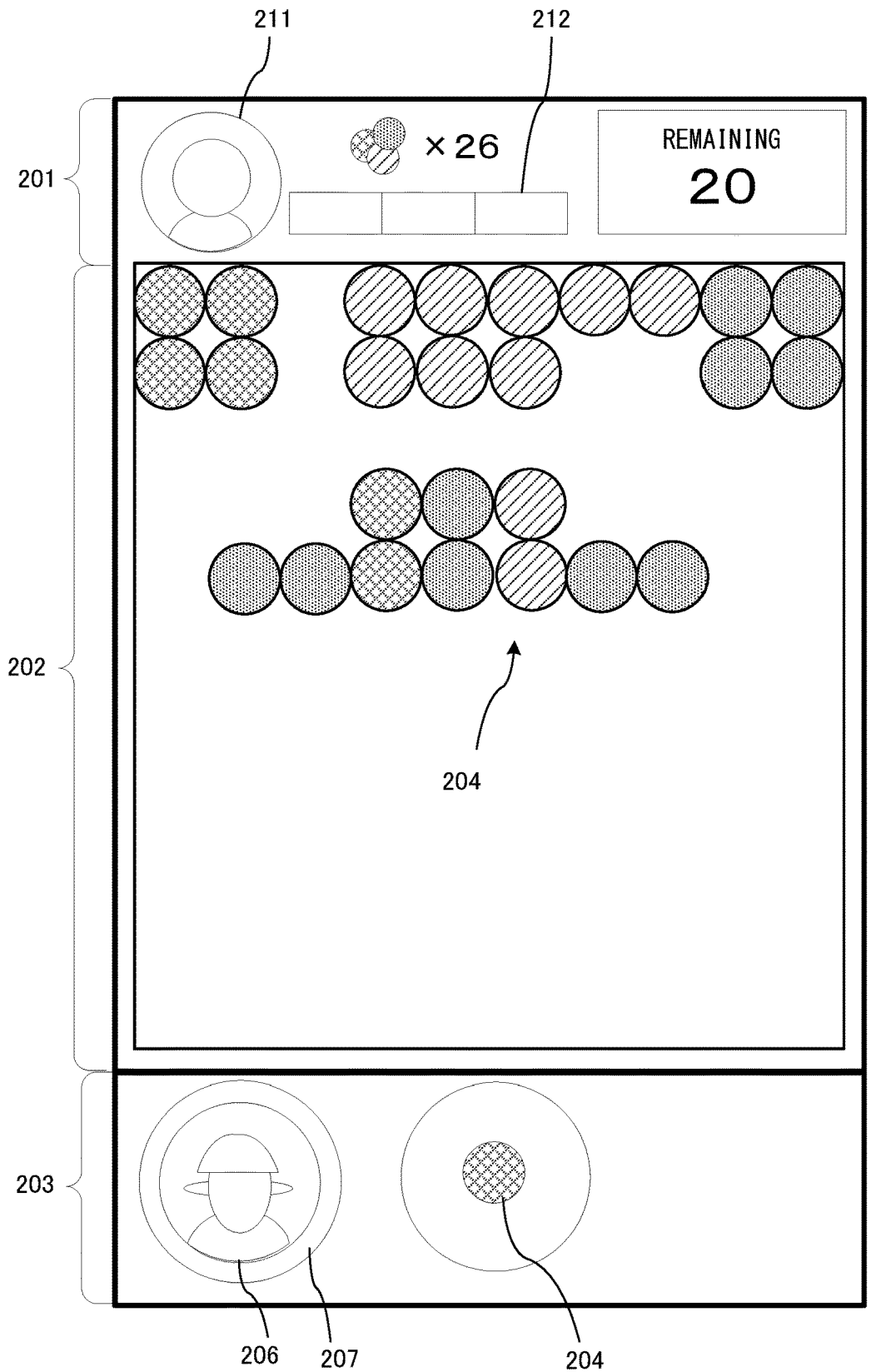
FIG. 4 illustrates a non-limiting screen example of a first game mode.

The outline of the first game mode will be described below. FIG. 4 shows an example of a game image related to the first game mode. Similar to the case of FIG. 2, the game image shown in FIG. 4 also includes three areas: an information area 201, a field area 202, and an operation area 203. Here, it is assumed that the user selects the character B when playing the first game mode. Thus, unlike the case of FIG. 2, the character B is shown as the player character 206 displayed in the operation area 203.

In the field area 202, similar to the second game mode, a plurality of puzzle objects 204 are displayed. In the first game mode as well, similar to the second game mode, a method for deleting puzzle objects 204 is to align three or more puzzle objects 204 of the same type vertically or horizontally. Thus, it can be said that the basic game rule (the method for deleting puzzle objects 204) is the same as that for the second game mode.

Next, the difference from the second game mode will be described. In the first game mode, an instructor character 211 and an instructor gauge 212 are displayed in the information area 201. In addition, similar to the second game mode, the remaining number of puzzle objects 204 in the field area 202 and the remaining number of operation target objects are also shown. Moreover, in the example of FIG. 4, the character A is displayed as the instructor character 211. That is, in the exemplary embodiment, the first game mode in a state where the instructor character 211 is the character A and the player character 206 is the character B will be described.

In the first game mode, a plurality of game stages are prepared, and the instructor character 211 is different for each stage. The instructor character 211 is an example of a non-owned character, and is a character that is not owned by the user themselves but is prepared for playing the first game mode (the type of an owned character owned by the user may be the same as that of the instructor character 211, but these characters are treated as different ones). Therefore, in the first game mode, since the instructor character is a non-owned character, the player character 206 and the instructor character 211 are always different characters. The instructor character 211 may be changed periodically, and, for example, the instructor character 211 (the stage that is associated therewith and presented to the user) may be replaced at regular intervals. As for such a non-owned character, an opportunity to acquire the non-owned character is given to the user by a character selection process as described above.

In the first game mode, the user can use not only the skill of the player character but also the skill of the instructor character 211. That is, the user can advance the game using skills of two characters. As described above, making it possible to also use the skill of the instructor character also provides an opportunity to try a skill of a character that is not owned by the user, particularly in the case where the instructor character 211 is a non-owned character. Moreover, even in the case where the instructor character 211 is an owned character, for example, in the case where the instructor character 211 is a character that is not often used, an opportunity to reconfirm or rediscover what skill the character has can be provided.

Moreover, by clearing the first game mode, a predetermined reward is given to the user. This reward is, for example, an item that can be used in the second game mode and with which it is possible to advance the game in an advantageous manner. Accordingly, motivation to play the first game mode in order to acquire such a reward can be provided to the user.

Next, the method for using a skill in the first game mode will be described. The method for using the skill of the player character 206 in the first game mode is the same as in the case of the second game mode. On the other hand, it is made possible to use the skill of the instructor character 211 by accumulating the instructor gauge 212 to the maximum value, but the method for accumulating the gauge is different from that in the second game mode. In other words, the condition for using the skill of the instructor character 211 is different from the condition for using the skill of the player character 206. Specifically, whereas the condition for using the skill of the player character 206 (how to accumulate the skill gauge 207) is to delete puzzle objects 204, the condition for using the skill of the instructor character 211 is to "place the operation target object three times". That is, when the user performs an operation for placing the operation target object in the field area, the instructor gauge 212 can be increased by one level regardless of the position at which the operation target object is placed or whether any puzzle object 204 has been deleted. In FIG. 4, the instructor gauge 212 is divided into three stages (three horizontally long rectangles). Therefore, when the user places the operation target object three times, the instructor gauge 212 is accumulated to the maximum value.

Figure 5:
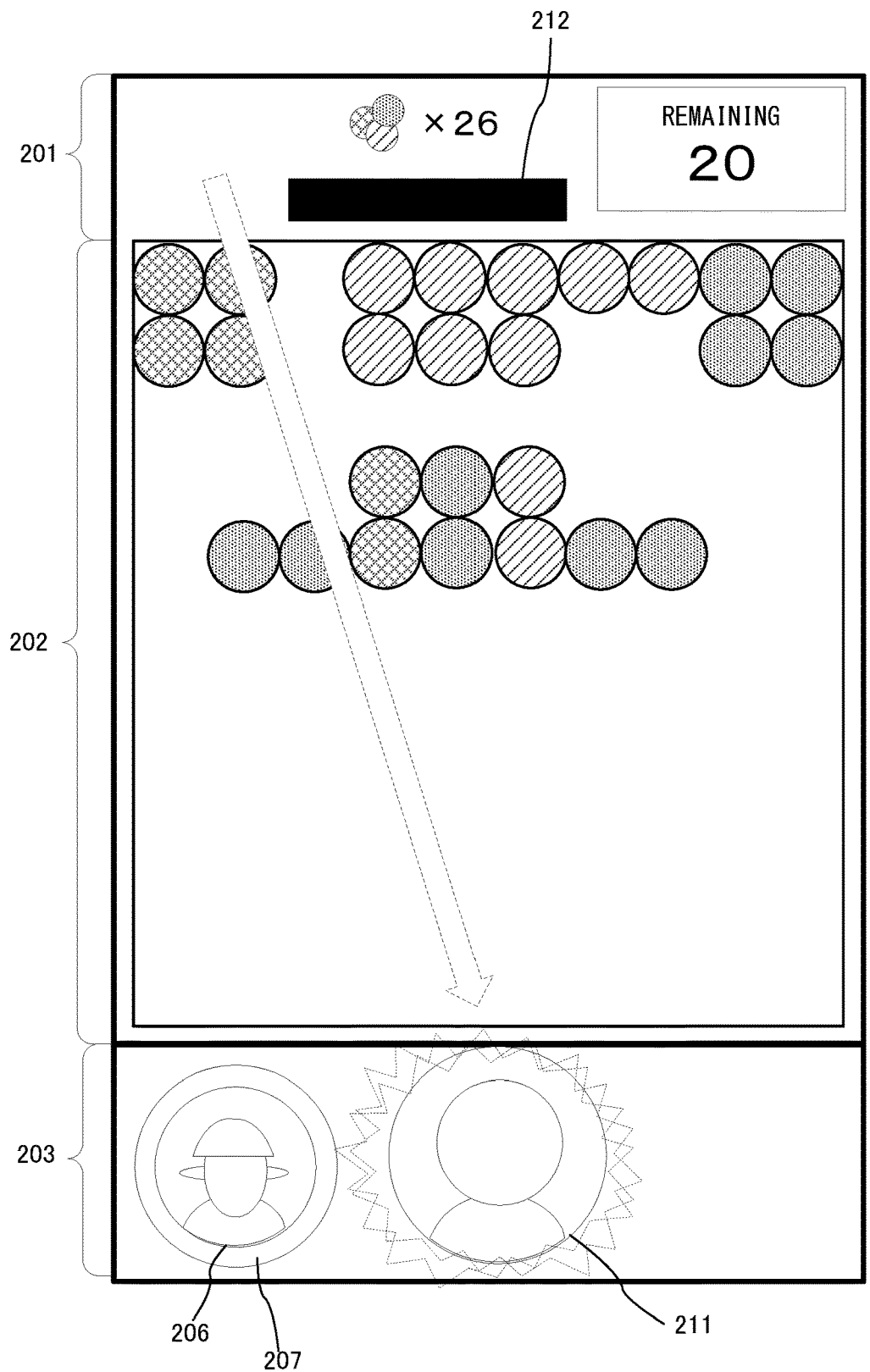
FIG. 5 illustrates a non-limiting screen example of the first game mode.
Figure 6:
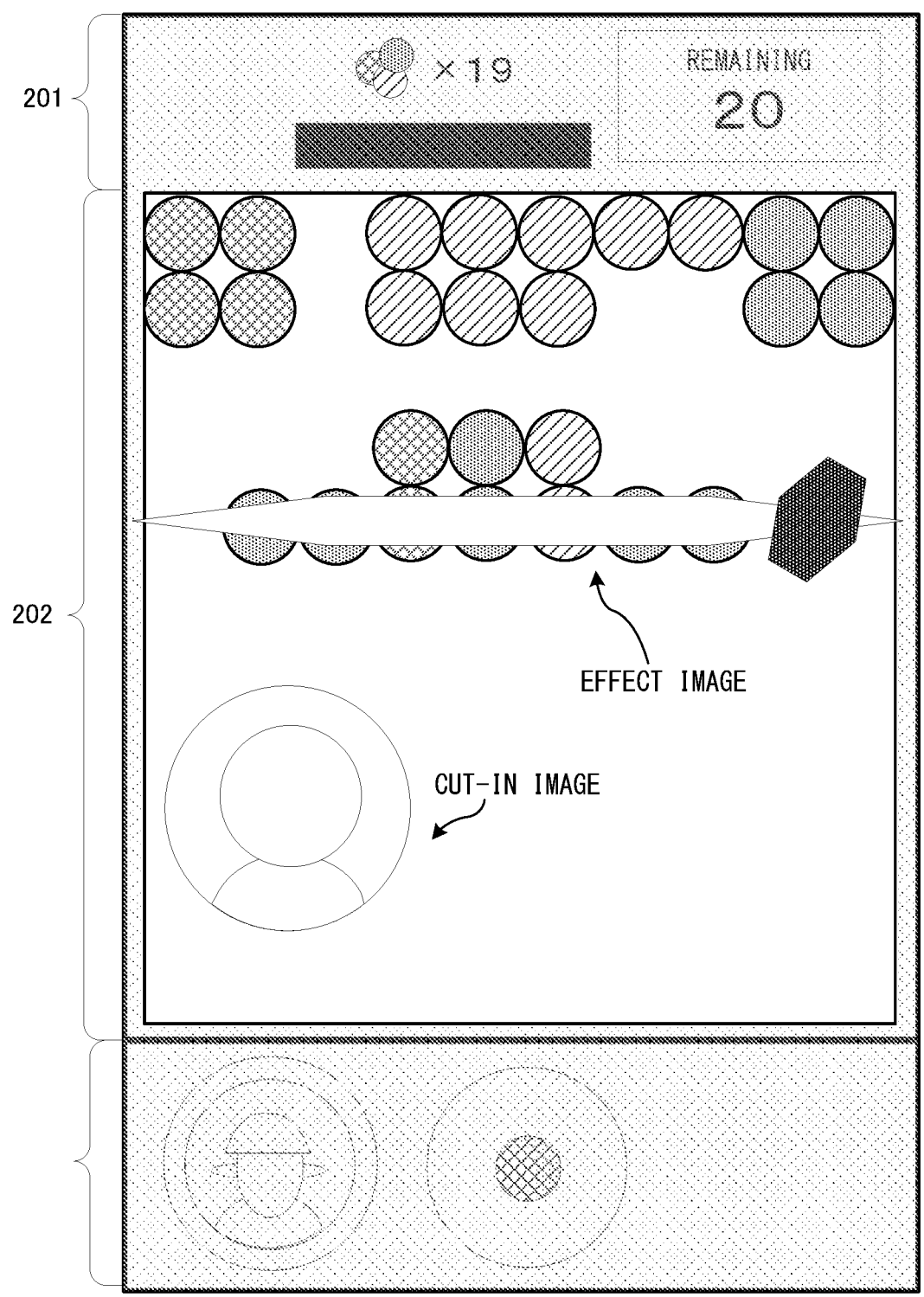
FIG. 6 illustrates a non-limiting screen example of the first game mode.
Figure 7:
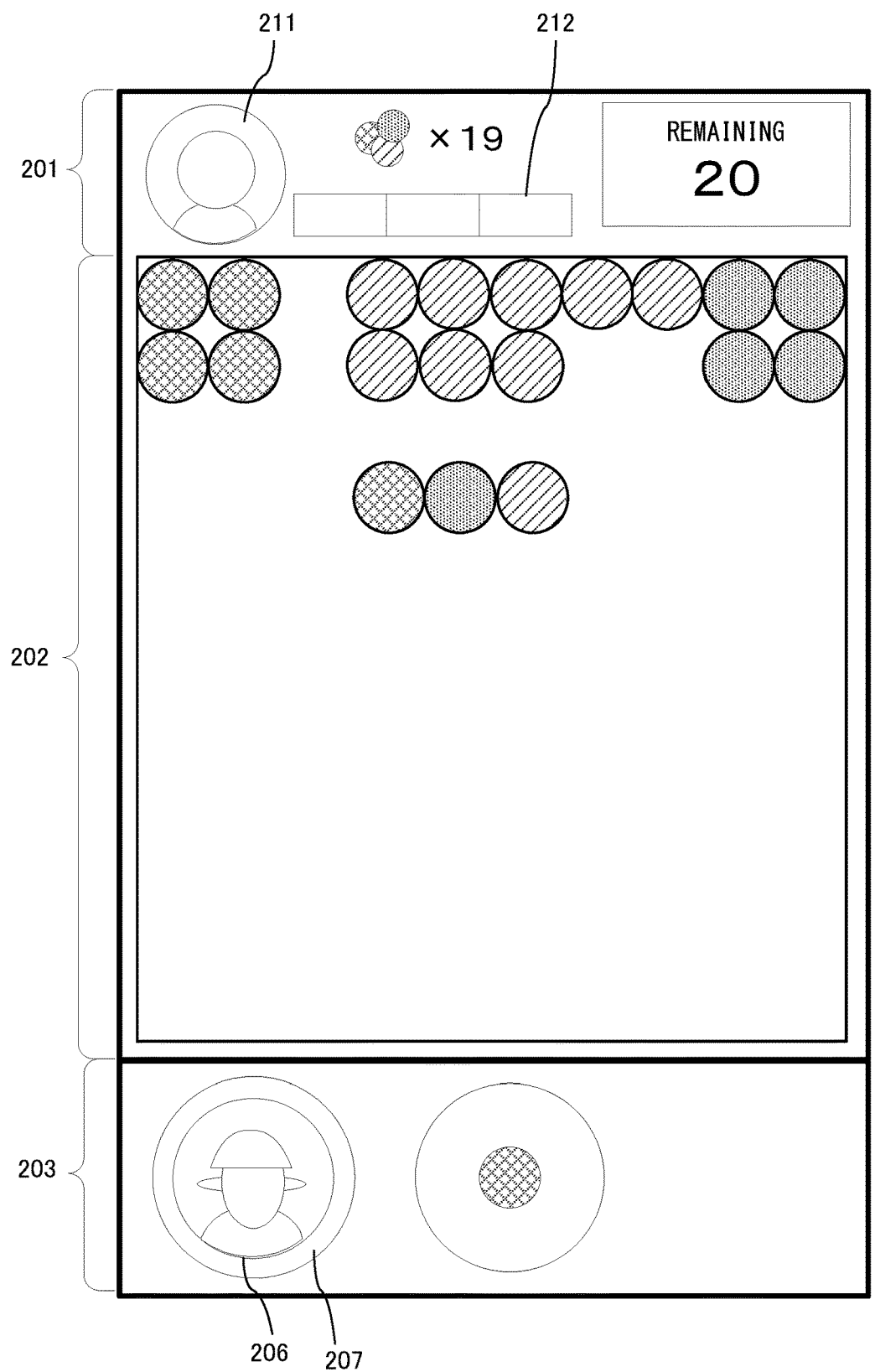
FIG. 7 illustrates a non-limiting screen example of the first game mode.

FIG. 5 shows an example of a game image when the instructor gauge 212 is accumulated to the maximum value. In the first game mode, when the instructor gauge 212 is accumulated to the maximum value, the instructor character 211 displayed in the information area 201 moves so as to be superimposed on the display position of the operation target object in the operation area 203. In addition, a visual effect such as blinking is also added to the image of the instructor character 211, which visually informs the user that use of the skill of the instructor character 211 is possible. Then, when the user performs a tap operation on the instructor character 211, the user can use the skill associated with the instructor character 211. In this example, since the instructor character 211 is the character A, an effect of "deleting the lowest horizontal row" is exercised similar to the above. FIG. 6 shows an example of a skill representation when the skill of the instructor character 211 is used. In FIG. 6, a cut-in image of the instructor character 211 is displayed, and an effect image that the puzzle objects 204 in the lowest horizontal row are deleted, is displayed. Then, when the skill representation is completed, the state of the field area 202 changes to a state where the puzzle objects 204 in the lowest horizontal row have been deleted as shown in FIG. 7. Along with this, the instructor gauge 212 also returns to the initial state. Furthermore, the display position of the instructor character 211 returns to the original position, and the operation area 203 also returns to a state where the operation target object is displayed. As described above, in the first game mode, a state where it is possible to use the skill of the instructor character 211 is obtained each time the operation target object is placed three times.

Here, the instructor character 211 is displayed at the position at which the operation target object has been displayed as described above, and in this state, the user cannot operate the operation target object, and can use only the skill of the instructor character 211 (however, if the skill gauge 207 has been accumulated to the maximum, a two-choice state with use of the skill of the player character 206 is obtained). Therefore, when it is made possible to use the skill of the instructor character 211, the operation target object cannot be further placed, and a state where the progress of the puzzle game is substantially restricted is obtained. In other words, in the case of this example, the skill of the instructor character 211 is semi-forced to be used by the user every time an operation is performed three times. Then, after the progress of the game is restricted, the restriction of the progress of the game is canceled when the user performs an operation for using the skill of the instructor character 211.

Regarding the skill of the instructor character, the reason why the restriction of the progress of the game can be canceled by an operation of the user after the progress of the game is restricted as described above, is as follows. First, if the timing to activate the skill of the instructor character 211 is left to the user, the user needs to consider not only the timing to activate the skill of the player character 206 but also the timing to activate the skill of the instructor character 211. This may make the game too difficult, especially for beginner users who are inexperienced in games. In addition, in the case where the instructor character 211 is a non-owned character, a situation where a user who is accustomed to games to some extent does not fully understand the characteristic, etc., of the skill, is conceivable. In this case as well, the difficulty of the game may become too high. On the other hand, if the skill of the instructor character is automatically activated without any operation of the user, the instructor character 211 seems to activate the skill without permission regardless of the user's intention, from the user's point of view, so that the user may feel stressed in the progress of the game. From this point of view, in the exemplary embodiment, the progress of the game is temporarily restricted, the skill of the instructor character 211 is activated by an operation of the user, and then the restriction of the progress of the game is cancelled. In another exemplary embodiment, for example, in a game setting screen, it may be made possible for the user to select which to use between automatic or manual operation as described above, as the method for activating the skill of the instructor character 211.

Also, whereas it is necessary to delete puzzle objects 204 in order to accumulate the skill gauge 207, it is only necessary to place the operation target object in order to accumulate the instructor gauge 212, and the latter condition is more easily achieved. That is, as for the latter condition, it is only necessary to perform an operation for "placing the operation target object in the field area 202 from the operation area 203". On the other hand, as for the former condition, occurrence of an event that puzzle objects 204 are deleted as a result of placing the operation target object is required. That is, even when the operation target object is placed, no puzzle object 204 may be deleted depending on the position at which the operation target object is placed, so that it is more difficult to achieve the former condition than the latter condition. In addition, as for the latter condition, an operation, of "placing the operation target object", which is indispensable for the progress of the game, is used. As a result, in the first game mode, the user is caused to use the skill of the instructor character 211 periodically (every time such an operation is performed three times). Accordingly, as compared to the case of the player character 206, the condition for using the skill can be satisfied with a simpler condition, and as a result, there are more opportunities to activate the skill of instructor character 211. Moreover, since the skill of the player character 206 can also be used, the user can advance the game using two types of skills, the skills of the instructor character 211 and the player character 206. Accordingly, a game experience different from that in the case of the second game mode can be provided to the user. For example, game development in which a skill is activated more frequently than in the case of the second game mode is achieved, and a game experience such as a faster game tempo can be provided.

Meanwhile, in the example described above, the same character A is the player character 206 in the second game mode and the instructor character 211 in the first game mode. Therefore, focusing on the character A and its skill, the condition for using the "skill A" having the same effect is different between the first game mode and the second game mode. That is, in the case of the above example, in the first game mode, the skill A can be used by achieving the condition that "the operation target object is placed three times". On the other hand, in the second game mode, the same skill A can be used by repeating "deletion of puzzle objects 204" to accumulate the skill gauge 207 to the maximum. As described above, in the puzzle game of the exemplary embodiment, even for the same skill having the same effect, the condition for activating the skill is different between the first game mode and the second game mode. Accordingly, as for a certain skill, the effect thereof can be exercised on a condition different for each game mode, and a different game experience as described above can be provided. As a result, the development of the game can be diverse.

[Details of Game Processing According to Exemplary Embodiment]

Next, the puzzle game processing according to the exemplary embodiment will be described in more detail with reference to FIG. 8 to FIG. 17.

[Data to be Used]

Figure 8:
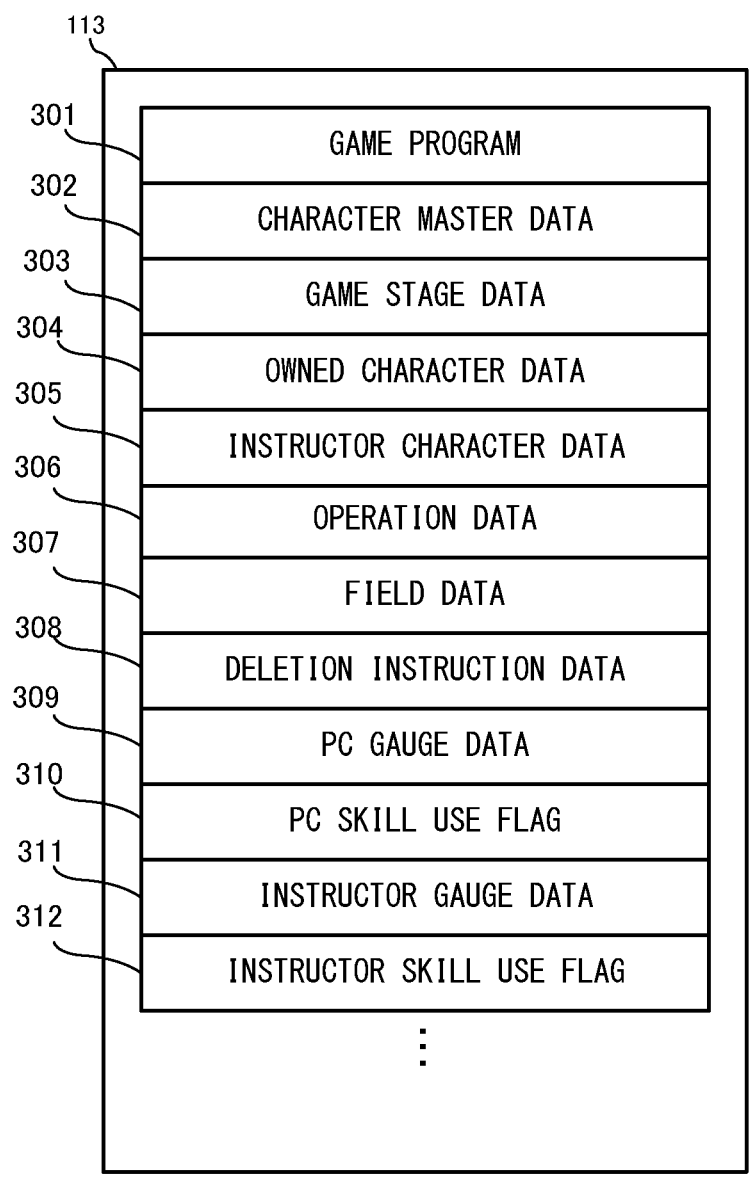
FIG. 8 illustrates a non-limiting example of a program and data stored in a memory 113 of the information processing apparatus 102.

First, various kinds of data to be used in the game processing will be described. FIG. 8 illustrates an example of a program and data stored in the memory 113 of the information processing apparatus 102. In the memory 113, a game program 301, character master data 302, game stage data 303, owned character data 304, instructor character data 305, operation data 306, field data 307, deletion instruction data 308, PC gauge data 309, a PC skill use flag 310, instructor gauge data 311, an instructor skill use flag 312, etc., are stored.

The game program 301 is a game program for executing the puzzle game processing according to the exemplary embodiment.

The character master data 302 is data that defines all characters that appear in this puzzle game. FIG. 9 shows an example of the data structure of the character master data 302. The character master data 302 is data in a table format and includes at least items such as a character ID 321, skill content information 322, and image data 322. The character ID 321 is information for uniquely identifying the character. The skill content information 322 is information indicating the effect contents of the skill of the character. For example, a method for specifying puzzle objects 204 to be deleted, etc., are defined. The image data 322 is image data indicating the appearance and the like of the character.

Referring back to FIG. 8, the game stage data 303 is data that defines the contents of each game stage included in the puzzle game. The game stage data 303 includes data for each game stage for the first game mode and data for each game stage for the second game mode. The data for each game stage includes information indicating the initial state of the field area 202, information indicating operation target objects to be caused to appear, etc. In addition, the data for each stage for the first game mode also includes information indicating the above instructor character 211 appearing in the stage, etc.

The owned character data 304 is information for specifying the owned character owned by the user. If a new character is given to (acquired by) the user as a result of a predetermined process for giving a character to the user (selection process, etc.), a character ID 321 indicating this character is added to the owned character data 304 as appropriate.

The instructor character data 305 is data that defines the above-described instructor character 211. The data structure of the instructor character data 305 is basically the same as that of the character master data 302, and an ID for identifying the instructor character 211 is set instead of the character ID 321. The contents of the instructor character data 305 can be changed/updated as necessary. For example, since the first game mode is an event-like game mode for a limited time as described above, it is assumed that the instructor character 211 is changed periodically. In such a case, for example, at the timing when the event is held, by receiving necessary data from a predetermined server, the contents of the instructor character data 305 are updated with information indicating the instructor character 211 appearing in the event held at that time.

The operation data 306 is data indicating the contents of various operations performed on the operation section 115. In the exemplary embodiment, the operation data 306 includes the presence/absence of an input to the touch panel as the operation section 115, data indicating a touch coordinate or the like of the input, data indicating pressed states of various buttons that are not shown, and the like. The contents of the operation data 306 are updated in predetermined cycles on the basis of a signal from the operation section 115.

The field data 307 is data for indicating the current state of the above-described field area 202. For example, the above field area 202 is managed as a field composed of 10 horizontal×10 vertical squares, and the field data 307 includes information indicating the presence/absence of the puzzle object 204 in each square. In addition, in the case where the puzzle object 204 is present in the square, the field data 307 also includes information indicating the type of the puzzle object 204.

The deletion instruction data 308 is data for identifying puzzle objects to be deleted from the field area 202 as a result of the above-described matching determination process or an operation for using the above-described skill.

The PC gauge data 309 is data corresponding to the skill gauge 207 of the player character 206. That is, the PC gauge data 309 is data indicating the degree of accumulation of the skill gauge 207.

The PC skill use flag 310 is data for indicating whether the use of the skill of the player character 206 (hereinafter, referred to as PC skill) has been instructed. When the use of the PC skill is instructed, the PC skill use flag 310 is set to be ON. During display of a skill representation, the ON state continues. When the display of the representation of the PC skill is completed, the PC skill use flag 310 is set to be OFF.

The instructor gauge data 311 is data corresponding to the instructor gauge 212 of the above instructor character 211. That is, the instructor gauge data 311 is data indicating the degree of accumulation of the instructor gauge 212.

The instructor skill use flag 312 is data for indicating whether the use of the skill of the instructor character 211 (hereinafter, referred to as an instructor skill) has been instructed. When the use of the instructor skill is instructed, the instructor skill use flag 312 is set to be ON. During display of a representation of the instructor skill, the ON state is maintained. When the display of the representation of the instructor skill is completed, the instructor skill use flag 312 is set to be OFF.

In addition to the above, various kinds of data required for the game processing are generated as necessary and stored in the memory 113.

[Details of Game Processing]

Next, the puzzle game processing according to the exemplary embodiment will be described in detail with reference to flowcharts. Here, processing related to the first game mode and the second game mode will be mainly described, and the description of other game processing is omitted. In addition, for convenience of description, the processing related to the second game mode will be described first, and then the processing related to the first game mode will be described.

[Processing of Second Game Mode]

Figure 10:
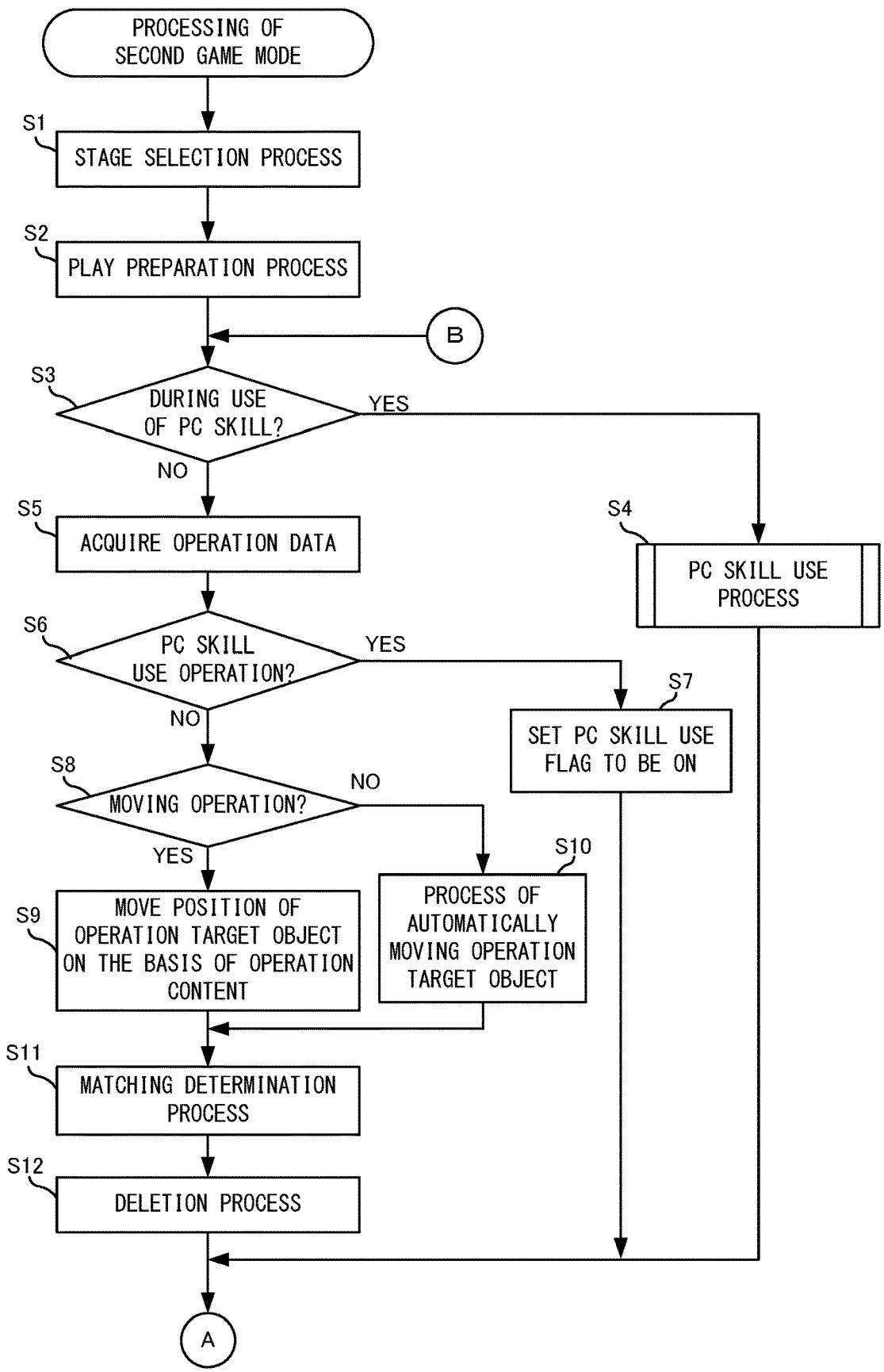
FIG. 10 is a flowchart showing processing of the second game mode in detail.
Figure 11:
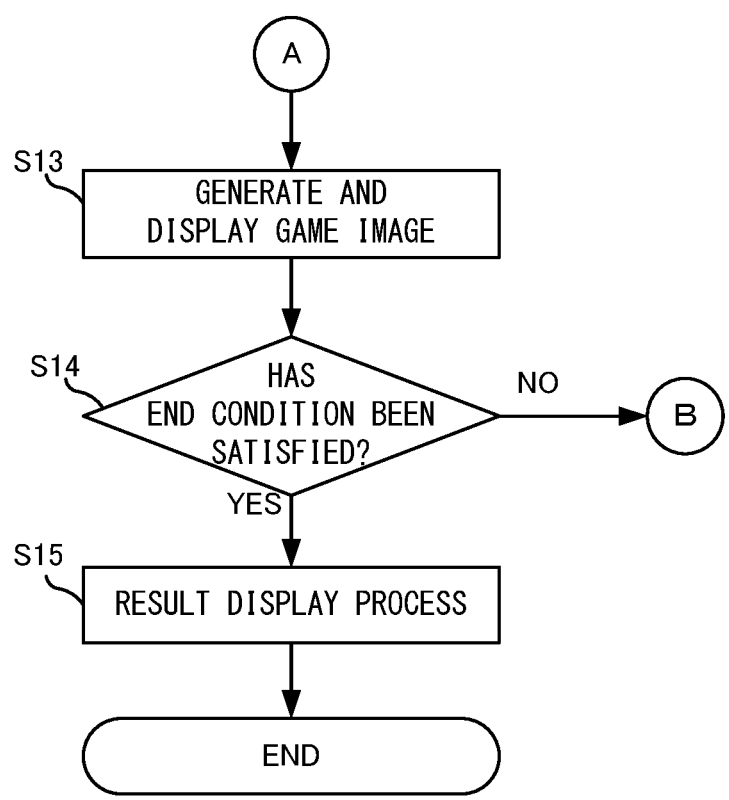
FIG. 11 is a flowchart showing the processing of the second game mode in detail.

FIG. 10 and FIG. 11 are flowcharts showing the processing of the second game mode in detail. From a menu screen which is not shown, the processing shown in FIG. 10 is started when the user performs a predetermined operation for starting play in the second game mode.

First, in step S1, the processor 111 executes a stage selection process. Specifically, the stage selection process is a process of determining a player character 206 to be used by the user and a stage to be played, on the basis of the operation data 306.

Next, in step S2, the processor 111 executes a play preparation process. Specifically, the processor 111 acquires data of the game stage corresponding to the determined stage, from the game stage data 303 and creates contents of the field area 202 on the basis of the acquired data. In addition, the processor 111 generates a game image as shown in FIG. 2, using the image of the player character 206 and the like, and outputs the generated game image to the display section 116. Thereafter, the processor 111 performs a play start representation of this stage and starts acceptance of an operation from the user.

Next, in step S3, the processor 111 determines whether the PC skill use flag 310 is ON. That is, the processor 111 determines whether the current state is during display of the representation of the PC skill. As a result of the determination, when the PC skill use flag 310 is not ON (NO in step S3), the processor 111 acquires the operation data 306 in step S5. Next, in step S6, the processor 111 determines whether the operation content indicated by the operation data 306 is an operation for using the PC skill. Specifically, on the basis of the operation data 306 and the PC gauge data 309, the processor 111 determines whether a tap operation has been performed at the display position of the player character 206 in a state where the skill gauge 207 has been accumulated to the maximum. As a result, when the operation for using the PC skill has been performed (YES in step S6), the processor 111 sets the PC skill use flag 310 to be ON in step S7. Thereafter, the processor 111 advances the processing to step S13 described later.

On the other hand, as a result of the determination in step S6, when the operation for using the PC skill has not been performed (NO in step S6), in step S8, the processor 111 determines whether an operation for moving the operation target object has been performed. Specifically, the operation for moving the operation target object is an operation for moving the operation target object from the inside of the operation area 203 to the field area 202 or an operation for moving the operation target object within the field area. When any of these operations has been performed (YES in step S8), in step S9, the processor 111 moves the operation target object on the basis of the operation content. Furthermore, the processor 111 also updates the contents of the field data 307 as appropriate such that this movement is reflected. Thereafter, the processor 111 advances the processing to step S11. On the other hand, when the moving operation has not been performed (NO in step S8), in step S10, the processor 111 executes a process of automatically moving the operation target object existing in the field area, directly upward by a predetermined distance. Moreover, the processor 111 also updates the contents of the field data 307 such that this movement is reflected. Accordingly, even when the user has not directly performed an operation, the operation target object that has not come into contact with another puzzle object 204 automatically moves directly upward.

Next, in step S11, the processor 111 performs a matching determination process. Specifically, the processor 111 refers to the field data 307 first, and determines whether three or more puzzle objects 204 of the same type aligned vertically or horizontally exist. As a result of the determination, when such puzzle objects 204 exist, the processor 111 sets information for specifying the puzzle objects 204 (for example, position coordinates or the like in the field area) in the deletion instruction data 308.

Next, in step S12, the processor 111 executes a deletion process. Specifically, the processor 111 refers to the deletion instruction data 308, and updates the contents of the field data 307 such that the puzzle objects 204 specified by the field data 307 are eliminated from the field area 202. Furthermore, the processor 111 performs display setting of the game image such that a representation that the puzzle objects 204 to be deleted are deleted is displayed. Moreover, the processor 111 updates the contents of the PC gauge data 309 in accordance with the contents of the deleted puzzle objects 204. That is, the processor 111 performs a process of increasing the skill gauge 207. Thereafter, the processor 111 determines whether the skill gauge 207 has been accumulated to the maximum. As a result, when the skill gauge 207 has been accumulated to the maximum, the processor 111 performs display setting of a representation indicating that the skill gauge 207 has been accumulated to the maximum (for example, blinking of the skill gauge 207). Accordingly, a representation to be made when the puzzle objects 204 are deleted, a representation that the skill gauge 207 is blinked, etc., are performed in a later-described game image display process. When there is no puzzle object 204 specified by the deletion instruction data 308 (when there is no puzzle object 204 to be deleted), the deletion process is not substantially performed.

Next, in step S13 in FIG. 11, the processor 111 performs a process of generating a game image in which the result of the above process is reflected, and displaying the game image on the display section 116.

Next, in step S14, the processor 111 determines whether a game end condition has been satisfied. That is, the processor 111 determines whether a condition for clearing the state has been achieved (stage clearing has been successful) or the current state is a state where the game cannot be advanced any more (stage clearing has failed). When the game end condition has not been satisfied (NO in step S14), the processor 111 returns to step S3 and repeats the process. On the other hand, when the game end condition has been satisfied (YES in step S14), the processor 111 executes a result display process in step S15. For example, when the stage has been cleared, the processor 111 displays a predetermined success representation. On the other hand, when stage clearing has failed, the processor 111 displays a predetermined failure representation. Thereafter, the processor 111 ends the puzzle game processing.

Figure 12:
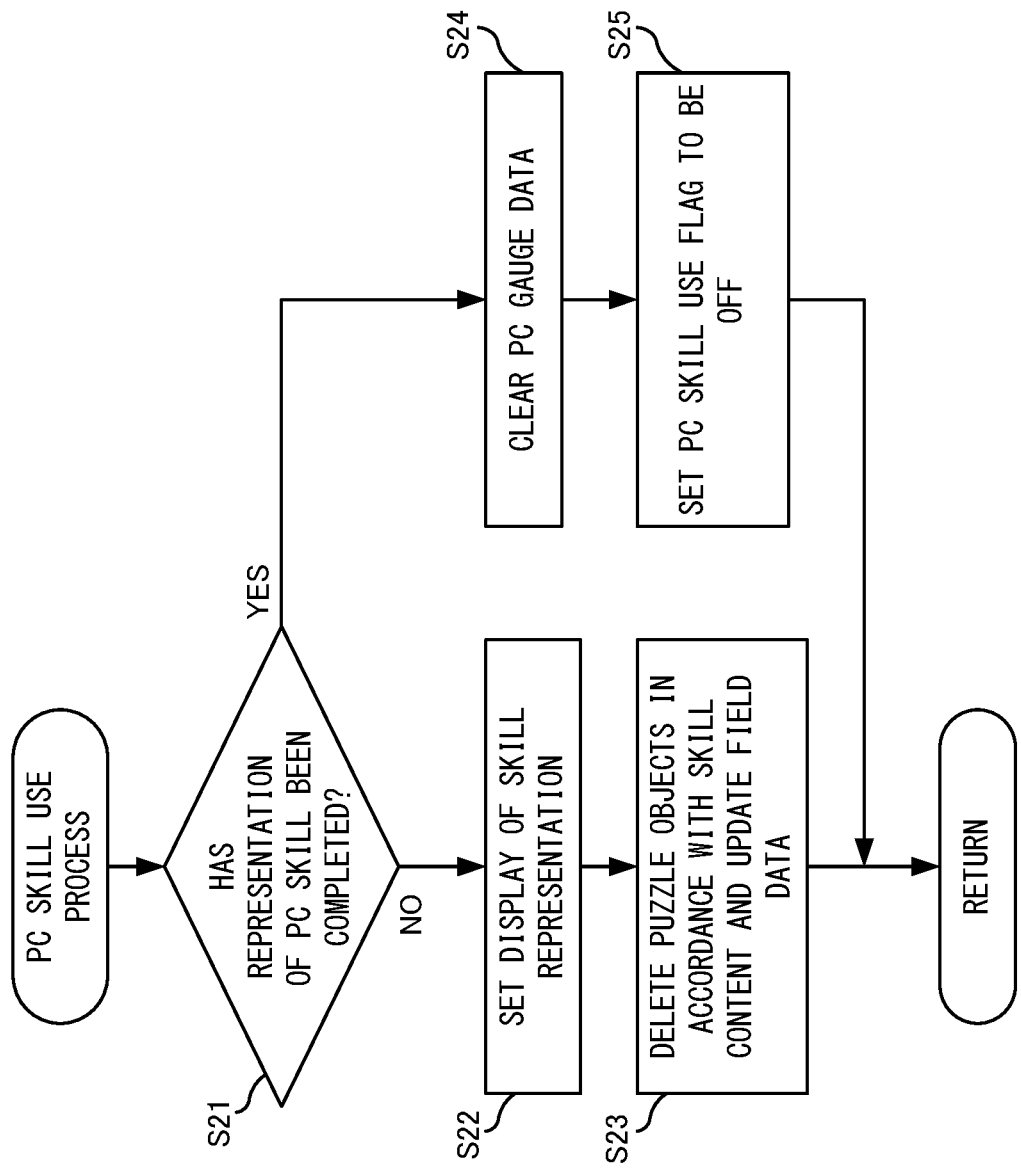
FIG. 12 is a flowchart showing a PC skill use process in detail.

Next, a process in the case where, as a result of the determination in step S3, it is determined that the PC skill use flag 310 is ON (YES in step S3), will be described. In this case, in step S4 in FIG. 10, the processor 111 executes a PC skill use process. FIG. 12 is a flowchart showing the PC skill use process in detail. In FIG. 12, first, in step S21, the processor 111 determines whether the display of the representation of the PC skill has been completed. This determination is performed, for example, on the basis of whether a time corresponding to a predetermined number of frames has elapsed from the start of the representation of the PC skill. As a result of the determination, when the display of the representation of the PC skill has not been completed (NO in step S21), in step S22, the processor 111 performs display setting such that the PC skill representation is displayed in the game image display process in step S13. The contents of the representation are determined on the basis of the skill content information 322 of the player character 206 used this time.

Next, in step S23, the processor 111 deletes the puzzle objects 204 as appropriate in accordance with the contents of the PC skill used this time, and updates the contents of the field data 307 such that this content is reflected. Thereafter, the PC skill use process ends.

On the other hand, as a result of the determination in step S21, when the display of the representation of the PC skill has been completed (YES in step S21), in step S24, the processor 111 clears the PC gauge data 309 and returns the skill gauge 207 to the initial state. Next, in step S25, the processor 111 sets the PC skill use flag 310 to be OFF. Thereafter, the PC skill use process ends.

When the PC skill use process ends, generation and display of a game image are performed in step S13 on the basis of the contents set here. As a result, while the PC skill use flag 310 is ON, the skill representation shown in FIG. 3 is displayed.

This is the end of the description of the processing of the second game mode.

[Details of Processing of First Game Mode]

Next, the processing of the first game mode will be described in detail. A part of the processing of the first game mode is substantially the same as the processing of the second game mode. Therefore, the detailed description of the part that overlaps the processing of the second game mode is omitted.

Figure 13:
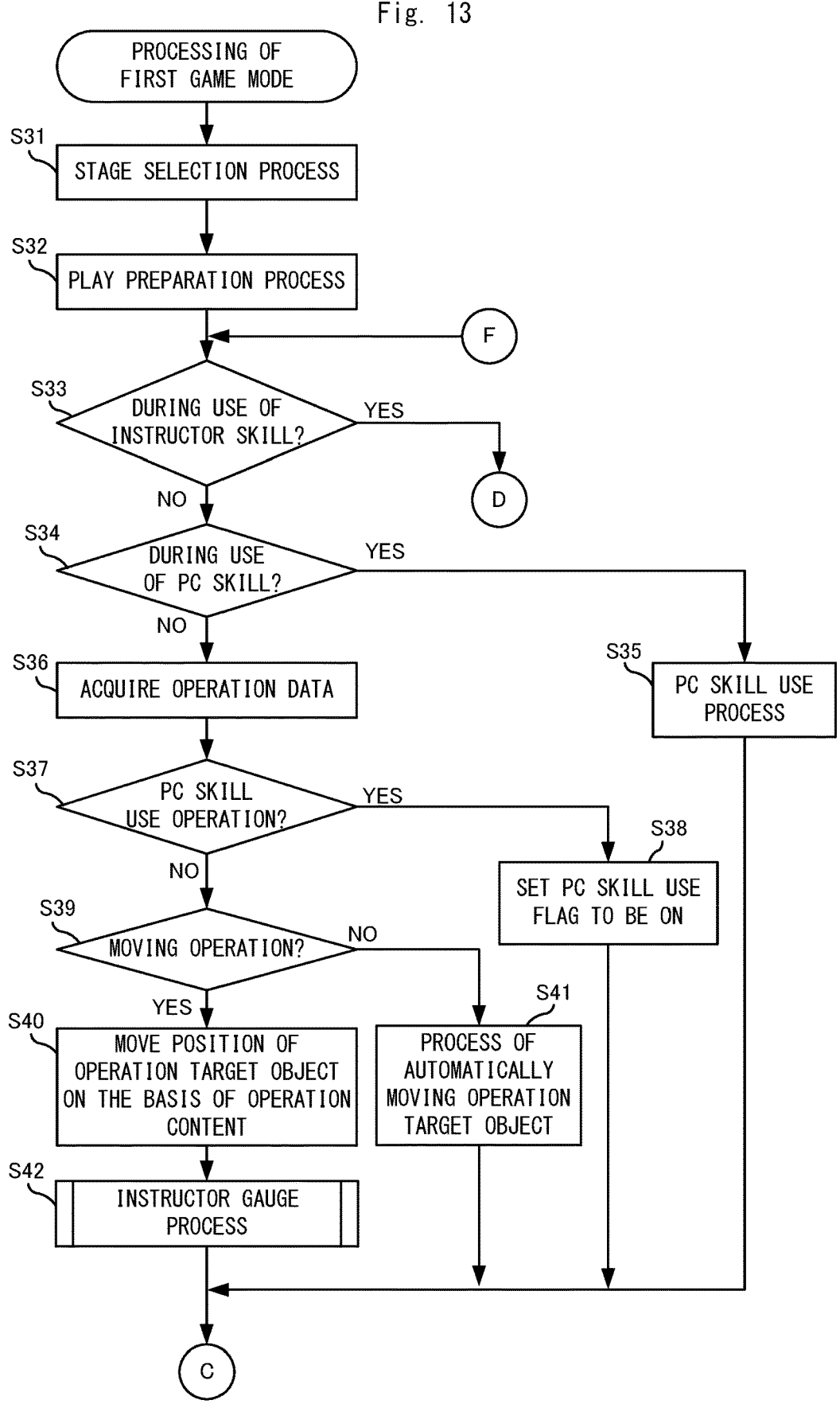
FIG. 13 is a flowchart showing processing of the first game mode in detail.
Figure 14:
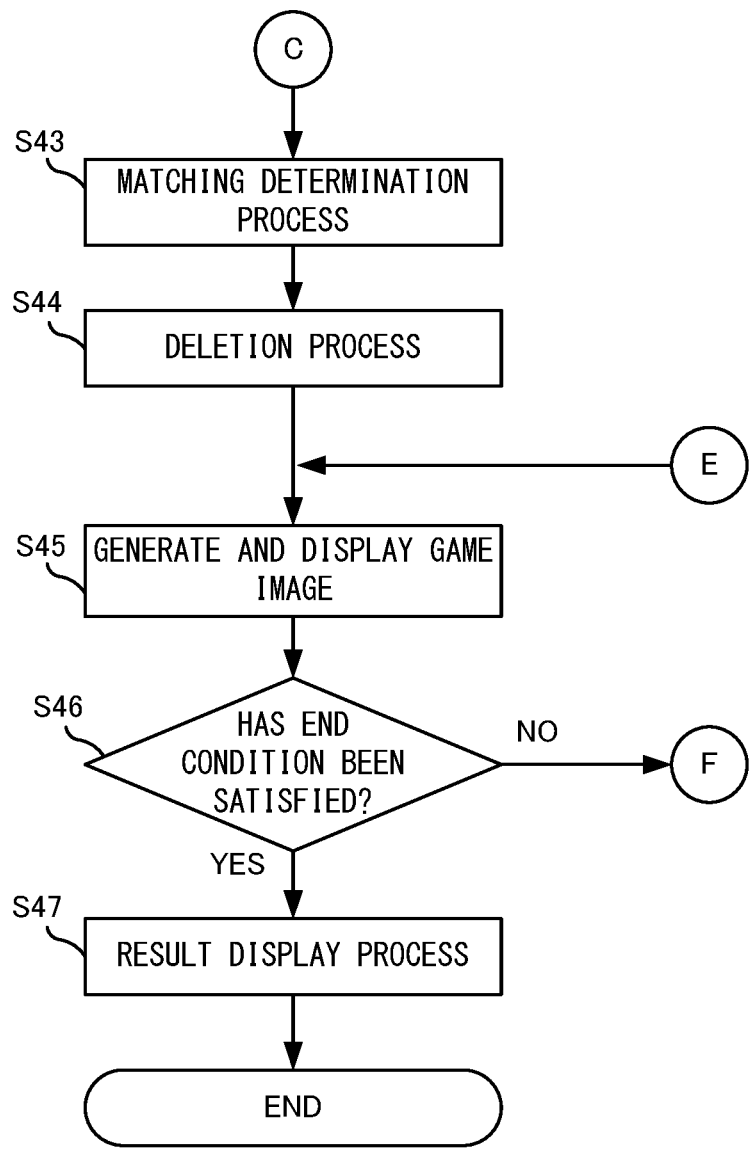
FIG. 14 is a flowchart showing the processing of the first game mode in detail.
Figure 15:
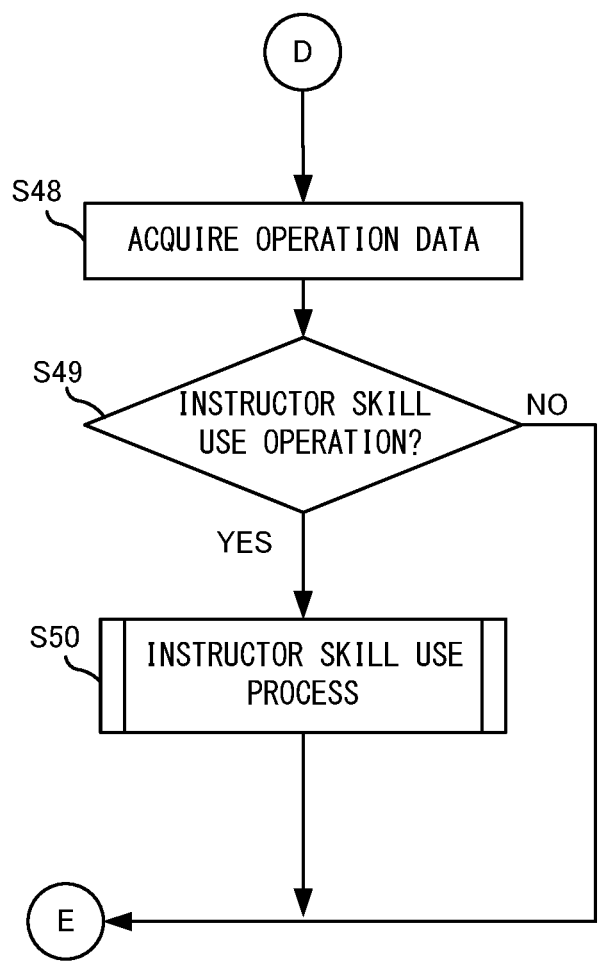
FIG. 15 is a flowchart showing the processing of the first game mode in detail.

FIG. 13 to FIG. 15 are flowcharts showing the processing of the first game mode in detail. From the menu screen which is not shown, the processing shown in FIG. 13 to FIG. 15 is started when the user performs a predetermined operation for starting play in the first game mode.

In FIG. 13, first, in step S31, the processor 111 executes a stage selection process. Subsequently, in step S32, the processor 111 executes a play preparation process. These processes are basically the same as the processes in steps S1 and S2. Therefore, the detailed description of these processes is omitted, and a process related to the instructor character 211, which is the difference from the process in step S2, is also performed as appropriate in step S32. Specifically, the processor 111 refers to the instructor character data 305 and reads the data of the instructor character 211 that appears in the first game mode. Then, the processor 111 also performs a process of generating an image of the instructor character 211 on the basis of this data.

Next, in step S33, the processor 111 determines whether the instructor skill use flag 312 is ON. As a result of the determination, when the instructor skill use flag 312 is OFF (NO in step S33), in step S34, the processor 111 determines whether the PC skill use flag 310 is ON. As a result of the determination, when the PC skill use flag 310 is ON (YES in step S34), in step S35, the processor 111 executes a PC skill use process. This process is the same process as in step S4, and thus the detailed description thereof is omitted. On the other hand, when the PC skill use flag 310 is OFF (NO in step S34), in step S36, the processor 111 acquires the operation data 306. Next, in step S37, the processor 111 determines whether the operation content indicated by the operation data 306 is an operation for using the above-described PC skill. As a result, when the operation for using the PC skill has been performed (YES in step S37), in step S38, the processor 111 sets the PC skill use flag 310 to be ON, and advances the processing to step S43 described later.

On the other hand, as a result of the determination in step S37, when the operation for using the PC skill has not been performed (NO in step S37), in step S39, the processor 111 determines whether an operation for moving the operation target object has been performed. As a result, when the moving operation has not been performed (NO in step S39), in step S41, the processor 111 executes a process of automatically moving the operation target object directly upward by a predetermined distance as described above in step S10. Thereafter, the processor 111 advances the processing to step S43.

On the other hand, as a result of the determination in step S39, when the moving operation has been performed (YES in step S39), in step S40, the processor 111 moves the operation target object on the basis of the operation content. Furthermore, the processor 111 also updates the contents of the field data 307 as appropriate such that this movement is reflected.

Figure 16:
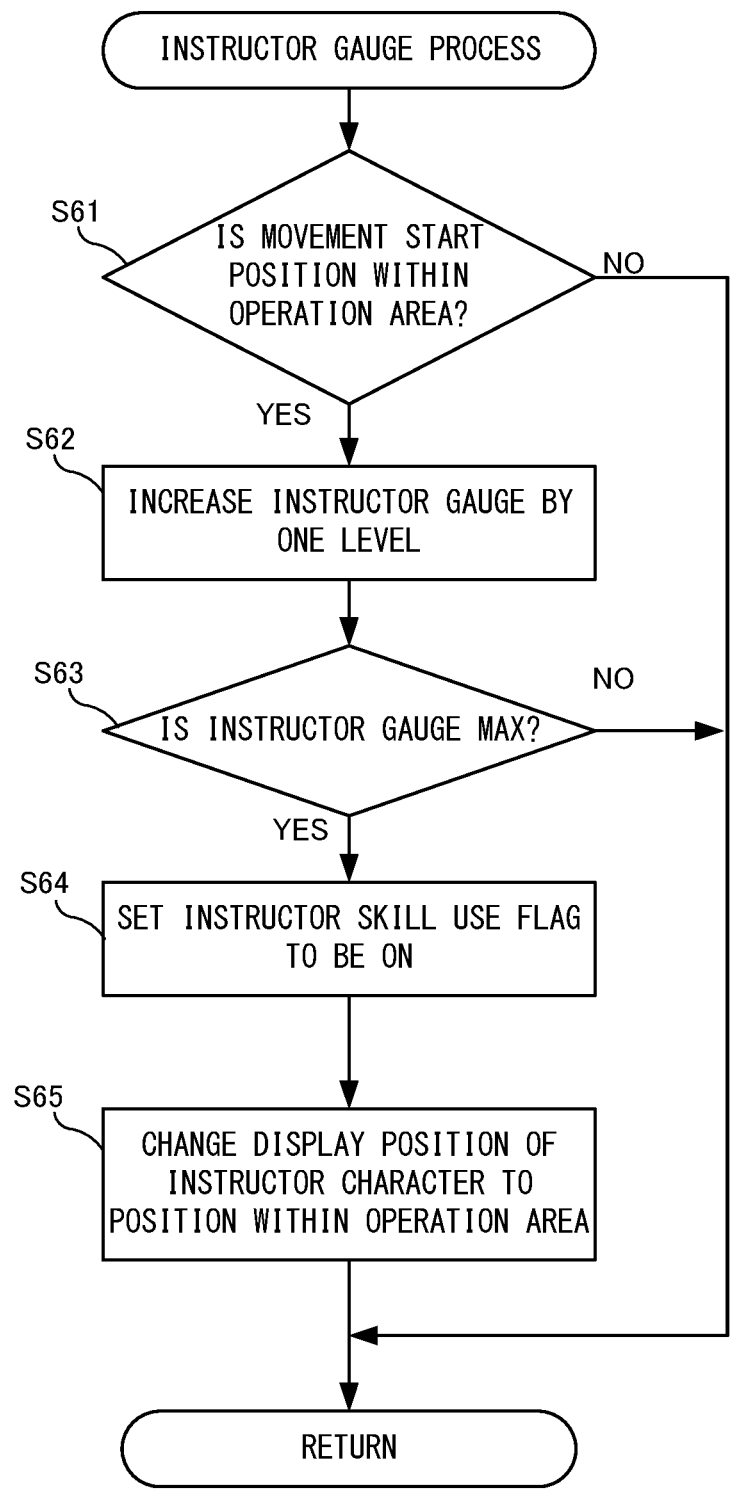
FIG. 16 is a flowchart showing an instructor gauge process in detail.

Next, in step S42, the processor 111 executes an instructor gauge process. This process is a process for increasing the instructor gauge 212 along with the moving operation. FIG. 16 is a flowchart showing the instructor gauge process in detail. In FIG. 16, first, in step S61, the processor 111 determines whether the moving operation is a moving operation for moving the operation target object from the inside of the operation area 203 to the field area 202. This determination can be performed, for example, on the basis of whether the touch start coordinate when the operation target object is dragged is the display position of the operation target object in the operation area 203. As a result of the determination, when the moving operation is not a moving operation for moving the operation target object from the inside of the operation area 203 to the field area 202 (NO in step S61), the instructor gauge process ends. On the other hand, when the moving operation is such a moving operation (YES in step S61), in step S62, the processor 111 updates the instructor gauge data 311 such that the instructor gauge 212 is increased by one level.

Next, in step S63, the processor 111 determines whether the instructor gauge 212 has been accumulated to the maximum, on the basis of the instructor gauge data 311. As a result of the determination, when the instructor gauge 212 has not been accumulated to the maximum (NO in step S63), the processor 111 ends the instructor gauge process. On the other hand, when the instructor gauge 212 has been accumulated to the maximum (YES in step S63), in step S64, the processor 111 sets the instructor skill use flag 312 to be ON. Next, in step S65, the processor 111 performs setting of display contents such that the display position of the image of the instructor character 211 is the position at which the operation target object in the operation area 203 is displayed, as shown in FIG. 5. Thereafter, the instructor gauge process ends.

Next, in step S43 in FIG. 14, the processor 111 performs a matching determination process which is the same process as in step S11. Subsequently, in step S44, the processor 111 performs a deletion process which is the same process as in step S12.

Next, in step S45, the processor 111 performs a process of generating a game image in which the result of the above process is reflected, and displaying the game image on the display section 116. Next, in step S46, the processor 111 performs game end determination which is the same as in step S14. When an end condition has been satisfied (YES in step S46), in step S47, the processor 111 executes a result display process which is the same as in step S15, and ends the processing of the first game mode. On the other hand, when the end condition has not been satisfied (NO in step S46), the processor 111 returns to step S33 and repeats the process.

Referring back to FIG. 13, a process in the case where, as a result of the determination in step S33, the instructor skill use flag 312 is ON (YES in step S33), will be described next. In this case, in step S48 in FIG. 15, the processor 111 acquires the operation data 306. Next, in step S49, the processor 111 determines whether the operation content indicated by the operation data 306 is an operation for using the instructor skill. Specifically, the processor 111 determines whether a tap operation has been performed on the instructor character 211 in the state shown in FIG. 5. When the operation for using the instructor skill has not been performed (NO in step S49), the processor 111 advances the processing to step S45. As a result, the game image in the state shown in FIG. 5 is continuously displayed until the user performs the operation for using the instructor skill, and a state where the progress of the game is substantially restricted is obtained.

Figure 17:
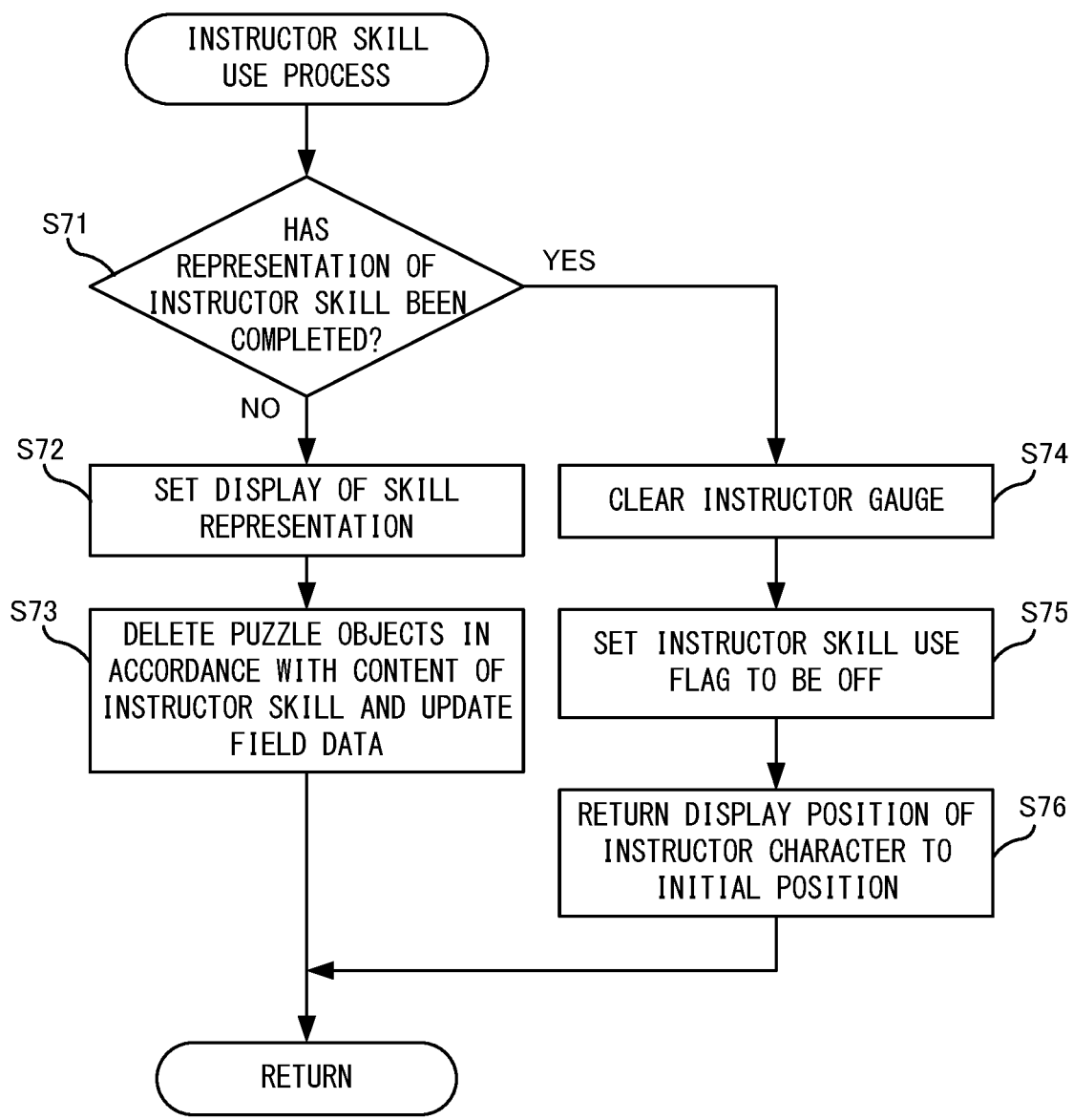
FIG. 17 is a flowchart showing an instructor skill use process in detail.

On the other hand, as a result of the determination in step S49, when the operation for using the instructor skill has been performed (YES in step S49), in step S50, the processor 111 executes an instructor skill use process. FIG. 17 is a flowchart showing the instructor skill use process in detail. In FIG. 17, first, in step S71, the processor 111 determines whether display of the representation of the instructor skill has been completed. As a result of the determination, when the display of the representation of the instructor skill has not been completed (NO in step S71), in step S72, the processor 111 performs display setting such that the PC skill representation is displayed in the game image display process in step S45. The contents of the representation are determined on the basis of the information that is defined by the instructor character data 305 and that indicates the skill contents of the instructor character 211 appearing this time.

Next, in step S73, the processor 111 refers to the instructor character data 305, and specifies puzzle objects 204 to be deleted, in accordance with the contents of the instructor skill used this time. Then, the processor 111 updates the contents of the field data 307 such that the specified puzzle objects 204 are deleted from the field area 202. Thereafter, the instructor skill use process ends.

On the other hand, as a result of the determination in step S71, when the display of the representation of the PC skill has been completed (YES in step S71), in step S74, the processor 111 clears the instructor gauge data 311 and returns the instructor gauge 212 to the initial state. Next, in step S75, the processor 111 sets the instructor skill use flag 312 to be OFF. Next, in step S76, the processor 111 performs display setting of the game image such that the display position of the instructor character 211 returns to the original position. Thereafter, the instructor skill use process ends.

Referring back to FIG. 15, when the instructor skill use process ends, the processor 111 advances the processing to step S45 and displays a game image.

This is the end of the detailed description of the processing of the first game mode.

As described above, in the exemplary embodiment, in the puzzle game, the condition for activating a certain skill is made different between the first game mode and the second game mode which are set in the puzzle game. In this regard, in a certain conventional game, even in the case where a plurality of game modes are set, the condition for activating a certain skill is generally common to each game mode. However, with the configuration as in the exemplary embodiment, the condition for activating the same skill is different between a first game mode and a second game mode which are different from each other, so that the user experience regarding skill use can be different between the first game mode and the second game mode. For example, even if a certain skill tends to be activated less frequently in one game mode, play can be performed in a state where the skill is activated more frequently in a different game mode, so that the user experience is made quite different between the game modes. Accordingly, the diversity of the game can be improved.

[Modifications]

In the above embodiment, the puzzle game, which is a match 3 game, has been described as an example. However, the above processing can be applied to other puzzle games in which the "skill" described above (or similar elements, for example, technique, magic, etc.) is set. In addition, the above processing can be applied not only to puzzle games but also to games of other genres. The above processing can also be applied to, for example, simulation games in which there is a skill of which use is made possible by a player unit defeating a certain number of enemy units.

In the above embodiment, regarding the condition for using the instructor skill, the example in which the instructor gauge 212 is accumulated by moving the puzzle object 204 into the field area 202 has been described. In addition, for example, the instructor gauge 212 may be automatically accumulated with the passage of time. Moreover, as the condition for using the instructor skill, a condition that is less difficult to achieve than the condition for using the PC skill may be used. Accordingly, even though the same skill is used, the user experience regarding skill use can be different for each game.

In the above embodiment, the example in which the owned character or the non-owned character is used as the instructor character 211 has been described. In addition, a dedicated character that is not given to the user may be used as the instructor character 211. The dedicated character may have the skill of each character that can be given to the user. In this case, for example, in the case where a dedicated instructor character activates a certain skill A in the first game mode, it is made possible to activate the skill A by achieving a first condition. In addition, it is also possible for the user to acquire a character having the skill A. Then, when using the skill A in the second game mode after the character is acquired, it is made possible to activate the skill A by achieving a second condition. Even in such case, the character associated with the skill A is different, and the condition for activating the same skill having the same effect is different depending on the game mode, so that the user experience regarding the use of the skill is different.

Moreover, when a dedicated character as described above is used, a character and a skill do not have to be associated with each other (a character does not have to have a skill) as in the above embodiment. For example, it may be made possible for the player character to acquire a plurality of skills by a predetermined giving process as described above, and an owned skill and a non-owned skill may be used instead of the owned character and the non-owned character. In this case, when selecting a stage in the second game mode, the user may be caused to select one skill from among owned skills, as a skill to be used in this play. Moreover, in the first game mode, one skill that can be used may be associated with each stage, and the above dedicated character may use this skill. In still another exemplary embodiment, such a dedicated character does not have to be used. For example, in the first game mode, the instructor character and the dedicated character do not have to appear, and the skill associated with the stage may be used on a first activation condition, regardless of whether the skill is an owned skill or a non-owned skill. In the second game mode, the user may be caused to select one skill from among owned skills when selecting a stage, and this skill may be used on a second condition set so as to be associated with each skill.

In the above embodiment, the case where the series of processes according to the game processing are performed in a single apparatus has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses.

In addition, a so-called cloud gaming configuration may be adopted. For example, the information processing apparatus 102 may be configured to send operation data indicating a user's operation to a predetermined server, and the server may be configured to execute various kinds of game processing and stream the execution results as video/audio to the information processing apparatus 102.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. A non-transitory computer-readable storage medium having stored therein instructions that, when executed by a processor of an information processing apparatus, cause the information processing apparatus to:
execute a first game in which at least a use character that can be used regardless of whether a user owns the use character is used, in an application;
execute a second game in which an owned character that is a character owned by the user is used, in the application;
while the first game is being executed:
track, based on performed user operations, a progress status for the first game,
determine when a first parameter, which is represented in a first skill gauge, satisfies a first condition in connection a first skill that is used by the use character, wherein the first parameter changes, and is reflected in the first skill gauge, in accordance with the progress status of the first game or operations performed in the first game, and
based on determination that the first parameter has satisfied the first condition, perform an in-game effect for the first game for use of the first skill; and
while the second game is being executed:
track, based on performed user operations, a progress status for the second game,
determine when a second parameter, which is represented in a skill gauge, satisfies a second condition for use of the first skill by the owned character, wherein the second condition is different from the first condition, wherein the second parameter changes, and is reflected in the skill gauge, in accordance with the progress status of the second game or operations performed in the second game, and
based on the determination that the second parameter has satisfied the second condition, perform an in-game effect for the second game for use of first skill.

2. The storage medium according to claim 1, wherein the first condition includesa whether a predetermined user operation is performed in the first game, and
the second condition includes whether the progress status of the game satisfies a predetermined condition as a result of the predetermined user operation being performed in the first game.

3. The storage medium according to claim 2, wherein the first condition includes a number of times that the predetermined user operation performed in the first game is accepted, and
the second condition includes a parameter that changes when the progress status of the second game satisfies a predetermined condition as a result of accepting the predetermined user operation.

4. The storage medium according to claim 3, wherein the second condition is more difficult to achieve than the first condition.

5. The storage medium according to claim 1, wherein game rules of the first game and the second game are at least partly common, and
a process, in which a progress status of the game based on a predetermined user operation when the predetermined user operation is performed in the first game is the same as that when the predetermined user operation is performed in the second game, is executed.

6. The storage medium according to claim 1, wherein, when the first condition is satisfied, progress of the first game is restricted until the in-game effect associated with the first skill is performed.

7. The storage medium according to claim 6, wherein performance of the in-game effect for the first game for use of the first skill is additionally based on a user operation being performed when a state of the first condition has been satisfied, and
restriction of the progress of the first game is cancelled in accordance with the in-game effect being performed.

8. The storage medium according to claim 1, wherein while the first game is being executed,
performing the in-game effect associated with the first skill of the owned character when the progress status of the first game satisfies the second condition.

9. The storage medium according to claim 1, wherein the instructions further cause the computer to:
when a predetermined giving condition is satisfied, give a character associated with the same skill as that of the use character, among a plurality of characters with each of which a skill is associated, as an owned character that is a character owned by the user, to the user.

10. The storage medium according to claim 1, wherein
the first game and the second game are puzzle games for a purpose of deleting puzzle objects,
the first condition includes a condition regarding a predetermined user operation being performed on the puzzle object, and
the second condition includes a condition regarding a parameter that changes when the puzzle object is deleted.

11. A processing system, comprising:
a processor and a memory coupled thereto, the processor being configured to control the processing system to perform operations comprising:
executing a first game in which at least a use character that can be used regardless of whether a user owns the use character is used, in an application;
executing a second game in which an owned character that is a character owned by the user is used, in the application;
while the first game is being executed:
tracking, based on performed user operations, a progress status for the first game,
determining when a first parameter, which is represented in a first skill gauge, satisfies a first condition in connection a first skill that is used by the use character, wherein the first parameter changes, and is reflected in the first skill gauge, in accordance with the progress status of the first game or operations performed in the first game,
based on determination that the first parameter has satisfied the first condition, performing an in-game effect for the first game for use of the first skill; and
while the second game is being executed:
tracking, based on performed user operations, a progress status for the second game,
determining when a second parameter, which is represented in a skill gauge, satisfies a second condition for use of the first skill by the owned character, wherein the second condition is different from the first condition, wherein the second parameter changes, and is reflected in the skill gauge, in accordance with the progress status of the second game or operations performed in the second game, and
based on the determination that the second parameter has satisfied the second condition, performing an in-game effect for the second game for use of the first skill.

12. An information processing method executed by a computer configured to control a processing system, the information processing method comprising:
executing a first game in which at least a use character that can be used regardless of whether a user owns the use character is used, in an application;
executing a second game in which an owned character that is a character owned by the user is used, in the application;
while the first game is being executed:
tracking, based on performed user operations, a progress status for the first game,
determining when a first parameter, which is represented in a first skill gauge, satisfies a first condition in connection a first skill that is used by the use character, wherein the first parameter changes, and is reflected in the first skill gauge, in accordance with the progress status of the first game or operations performed in the first game,
based on determination that the first parameter has satisfied the first condition, performing an in-game effect for the first game for use of the first skill; and
while the second game is being executed:
tracking, based on performed user operations, a progress status for the second game,
determining when a second parameter, which is represented in a skill gauge, satisfies a second condition for use of the first skill by the owned character, wherein the second condition is different from the first condition, wherein the second parameter changes, and is reflected in the skill gauge, in accordance with the progress status of the second game or operations performed in the second game, and
based on the determination that the second parameter has satisfied the second condition, performing an in-game effect for the second game for use of the first skill.

13. An information processing apparatus, comprising:
a processor and a memory coupled thereto, the processor being configured to control the information processing apparatus to at least:
execute a first game in which at least a use character that can be used regardless of whether a user owns the use character is used, in an application;
execute a second game in which an owned character that is a character owned by the user is used, in the application;
while the first game is being executed:
track, based on performed user operations, a progress status for the first game,
determine when a first parameter, which is represented in a first skill gauge, satisfies a first condition in connection a first skill that is used by the use character, wherein the first parameter changes, and is reflected in the first skill gauge, in accordance with the progress status of the first game or operations performed in the first game, and
based on determination that the first parameter has satisfied the first condition, perform an in-game effect for the first game for use of the first skill; and
while the second game is being executed:
track, based on performed user operations, a progress status for the second game,
determine when a second parameter, which is represented in a skill gauge, satisfies a second condition for use of the first skill by the owned character, wherein the second condition is different from the first condition, wherein the second parameter changes, and is reflected in the skill gauge, in accordance with the progress status of the second game or operations performed in the second game, and based on the determination that the second parameter has satisfied the second condition, perform an in-game effect for the second game for use of the first skill.

14. A non-transitory computer-readable storage medium having stored therein instructions that, when executed by a processor of an information processing apparatus, cause the information processing apparatus to perform operations comprising:

executing a first game mode of a video game in which at least a use character that can be used regardless of whether a user owns the use character is used;

executing a second game mode in the video game in which an owned character that is a character owned by the user is used;

while the first game mode is being executed:
tracking, based on performed user operations, a progress status for the first game mode,
determining when a first parameter, which is represented in a first skill gauge, satisfies a first condition in connection a first skill that is used by the use character, wherein the first parameter changes, and is reflected in the first skill gauge, in accordance with the progress status of the first game mode or operations performed in the first game mode, and based on determination that the first parameter has satisfied the first condition, performing an in-game effect for the first game mode for use of the first skill; and while the second game mode is being executed:
tracking, based on performed user operations, a progress status for the second game mode,
determining when a second parameter, which is represented in a skill gauge, satisfies a second condition for use of the first skill by the owned character, wherein the second condition is different from the first condition, wherein the second parameter changes, and is reflected in the skill gauge, in accordance with the progress status of the second game mode or operations performed in the second game mode, and based on the determination that the second parameter has satisfied the second condition, performing an in-game effect for the second game mode for use of the first skill.

15. The storage medium according to claim 14, wherein the first condition includes a condition that requires a number of times a predetermined user operation has been performed, and the second condition includes a condition based on the number of times a specific game processing result is obtained, among a plurality of game processing results obtained as a result of predetermined game processing being performed when the predetermined user operation is performed.

16. The storage medium according to claim 15, wherein the predetermined user operation is an operation for moving a predetermined object, and the operations further comprise:
in the first game mode, when the first condition is satisfied, restricting acceptance of the user operation for moving the predetermined object; and
in the first game mode, canceling the restriction after the in-game effect associated with the first skill is performed in accordance with an operation of the user for using the first skill.

17. A processing system, comprising:
a processor and a memory coupled thereto, the processor being configured to control the processing system to at least perform operations comprising:

executing a first game mode of a video game in which at least a use character that can be used regardless of whether a user owns the use character is used;

executing a second game mode in the video game in which an owned character that is a character owned by the user is used;

while the first game mode is being executed:
tracking, based on performed user operations, a progress status for the first game mode,
determining when a first parameter, which is represented in a first skill gauge, satisfies a first condition in connection a first skill that is used by the use character, wherein the first parameter changes, and is reflected in the first skill gauge, in accordance with the progress status of the first game mode or operations performed in the first game mode, and based on determination that the first parameter has satisfied the first condition, performing an in-game effect for the first game mode for use of the first skill; and while the second game mode is being executed:
tracking, based on performed user operations, a progress status for the second game mode,
determining when a second parameter, which is represented in a skill gauge, satisfies a second condition for use of the first skill by the owned character, wherein the second condition is different from the first condition, wherein the second parameter changes, and is reflected in the skill gauge, in accordance with the progress status of the second game mode or operations performed in the second game mode, and based on the determination that the second parameter has satisfied the second condition, performing an in-game effect for the second game mode for use of the first skill.

18. An information processing method executed by a computer configured to control a processing system, the information processing method comprising:

executing a first game mode of a video game in which at least a use character that can be used regardless of whether a user owns the use character is used;

executing a second game mode in the video game in which an owned character that is a character owned by the user is used;

while the first game mode is being executed:
tracking, based on performed user operations, a progress status for the first game mode,
determining when a first parameter, which is represented in a first skill gauge, satisfies a first condition in connection a first skill that is used by the use character, wherein the first parameter changes, and is reflected in the first skill gauge, in accordance with the progress status of the first game mode or operations performed in the first game mode, and based on determination that the first parameter has satisfied the first condition, performing an in-game effect for the first game mode for use of the first skill; and while the second game mode is being executed:
- tracking, based on performed user operations, a progress status for the second game mode,
- determining when a second parameter, which is represented in a skill gauge, satisfies a second condition for use of the first skill by the owned character, wherein the second condition is different from the first condition, wherein the second parameter changes, and is reflected in the skill gauge, in accordance with the progress status of the second game mode or operations performed in the second game mode, and
- based on the determination that the second parameter has satisfied the second condition, performing an in-game effect for the second game mode for use of the first skill.

19. An information processing apparatus, comprising:
a processor and a memory coupled thereto, the processor being configured to control the information processing apparatus to at least perform operations comprising:
executing a first game mode of a video game in which at least a use character that can be used regardless of whether a user owns the use character is used;
executing a second game mode in the video game in which an owned character that is a character owned by the user is used;
while the first game mode is being executed:
- tracking, based on performed user operations, a progress status for the first game mode,
- determining when a first parameter, which is represented in a first skill gauge, satisfies a first condition in connection a first skill that is used by the use character, wherein the first parameter changes, and is reflected in the first skill gauge, in accordance with the progress status of the first game mode or operations performed in the first game mode, and
- based on determination that the first parameter has satisfied the first condition, performing an in-game effect for the first game mode for use of the first skill; and while the second game mode is being executed:
- tracking, based on performed user operations, a progress status for the second game mode,
- determining when a second parameter, which is represented in a skill gauge, satisfies a second condition for use of the first skill by the owned character, wherein the second condition is different from the first condition, wherein the second parameter changes, and is reflected in the skill gauge, in accordance with the progress status of the second game mode or operations performed in the second game mode, and
- based on the determination that the second parameter has satisfied the second condition, performing an in-game effect for the second game mode for use of the first skill.

* * * * *